(12) United States Patent
Karaki et al.

(10) Patent No.: US 12,137,448 B2
(45) Date of Patent: Nov. 5, 2024

(54) CONFIGURED UPLINK FOR UNLICENSED OPERATION

(71) Applicant: Telefonaktiebolaget LM Ericsson (publ), Stockholm (SE)

(72) Inventors: Reem Karaki, Aachen (DE); Jung-Fu Cheng, Fremont, CA (US); Sorour Falahati, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 705 days.

(21) Appl. No.: 17/280,589

(22) PCT Filed: Sep. 27, 2019

(86) PCT No.: PCT/EP2019/076321
§ 371 (c)(1),
(2) Date: Mar. 26, 2021

(87) PCT Pub. No.: WO2020/065075
PCT Pub. Date: Apr. 2, 2020

(65) Prior Publication Data
US 2021/0377976 A1    Dec. 2, 2021

Related U.S. Application Data

(60) Provisional application No. 62/738,835, filed on Sep. 28, 2018.

(51) Int. Cl.
*H04L 5/00* (2006.01)
*H04L 1/18* (2023.01)
(Continued)

(52) U.S. Cl.
CPC ....... *H04W 72/1268* (2013.01); *H04L 5/0048* (2013.01); *H04L 5/0094* (2013.01);
(Continued)

(58) Field of Classification Search
CPC ......... H04W 72/1268; H04W 74/0808; H04W 72/23; H04W 16/14; H04W 16/16;
(Continued)

(56) References Cited

U.S. PATENT DOCUMENTS 10,251,197 B2 * 4/2019 Yerramalli ........ H04W 74/0816
10,321,416 B2 * 6/2019 Tiirola ................ H04W 52/241
(Continued)

OTHER PUBLICATIONS

PCT International Search Report and Written Opinion mailed Dec. 19, 2019 for International Application No. PCT/EP2019/076321, 9 pages.
(Continued)

*Primary Examiner* — Rebecca E Song
*Assistant Examiner* — Vanneilian Lalchinthang
(74) *Attorney, Agent, or Firm* — Sage Patent Group

(57) ABSTRACT

A method performed by a wireless device (110) includes receiving a configuration for one or more data transmission starting positions for a configured uplink, UL, in unlicensed spectrum. The one or more data transmission starting positions include at least a first starting position. The method further includes performing an UL transmission at one of the one or more data transmission starting positions based on when the wireless device is able to access a channel. The UL transmission includes UL control information, UCI, multiplexed in a Physical Uplink Shared Channel, PUSCH. The UCI carries one or more parameters for unlicensed spectrum.

18 Claims, 17 Drawing Sheets

(51) Int. Cl.
*H04W 16/14* (2009.01)
*H04W 52/36* (2009.01)
*H04W 72/04* (2023.01)
*H04W 72/1268* (2023.01)
*H04W 72/21* (2023.01)
*H04W 72/23* (2023.01)

(52) U.S. Cl.
CPC ........... *H04W 16/14* (2013.01); *H04W 72/21* (2023.01); *H04W 72/23* (2023.01); *H04L 5/001* (2013.01); *H04L 5/0055* (2013.01)

(58) Field of Classification Search
CPC ......... H04W 72/1284; H04W 72/1289; H04W 52/367; H04W 72/21; H04W 72/115; H04W 72/14; H04L 1/0031; H04L 1/1664; H04L 1/1861; H04L 5/0048; H04L 5/0051; H04L 5/0094; H04L 5/10; H04L 1/0026; H04L 1/0072; H04L 27/2601; H04L 27/2655; H04L 5/001; H04L 5/0053; H04L 5/0055; H04L 5/0057; H04B 7/0486; H04B 7/0632; H04B 7/0639
USPC ........................................................ 370/329
See application file for complete search history.

(56) References Cited

U.S. PATENT DOCUMENTS

| | | | |
|---|---|---|---|
| 10,491,335 B2* | 11/2019 | Rudolf | H04W 72/0446 |
| 10,925,089 B2* | 2/2021 | Harada | H04W 16/14 |
| 11,588,604 B2* | 2/2023 | Zhu | H04L 5/0053 |
| 2011/0299500 A1* | 12/2011 | Papasakellariou | H04W 72/21 370/329 |
| 2017/0163388 A1* | 6/2017 | Wiemann | H04L 1/1887 |
| 2018/0279291 A1* | 9/2018 | Tiirola | H04L 25/0224 |
| 2019/0069312 A1* | 2/2019 | Oh | H04W 72/0446 |
| 2019/0199477 A1* | 6/2019 | Park | H04W 72/1268 |
| 2020/0052835 A1* | 2/2020 | Xiong | H04L 1/1819 |
| 2020/0059332 A1* | 2/2020 | Takeda | H04L 1/1861 |
| 2020/0396047 A1* | 12/2020 | Gao | H04L 5/10 |
| 2021/0058922 A1* | 2/2021 | Han | H04L 5/0055 |

OTHER PUBLICATIONS

Vivo, 3GPP TSG RAN WG1 Meeting #94, R1-1808240, "Discussion on the Enhancements to Configured Grants", Gothenburg, Sweden, Aug. 20-24, 2018, 4 pages, XP051515625.

Intel Corporation, 3GPP TSG RAN WG1 Meeting #92 bis, R1-1804730, "UCI on PUSCH", Sanya, China, Apr. 16-20, 2018, 6 pages, XP051426997.

Huawei et al., 3GPP TSG RAN WG1 Meeting #93, R1-1805887, "Remaining Issues on UCI multiplexing", Busan, Korea, May 21-25, 2018, 8 pages, XP051462257.

* cited by examiner

CONFIGURED UPLINK FOR UNLICENSED OPERATION

CROSS-REFERENCE TO RELATED APPLICATIONS

This application is a 35 U.S.C. § 371 national stage application for International Application No. PCT/EP2019/076321, entitled "CONFIGURED UPLINK FOR UNLICENSED OPERATION", filed on Sep. 27, 2019, which claims priority to U.S. Provisional Patent Application No. 62/738,835, filed on Sep. 28, 2018, the disclosures and contents of which are hereby incorporated by reference in their entireties.

TECHNICAL FIELD

Embodiments herein relate generally to a configured uplink for unlicensed operation. More particularly configuring a wireless device for a configured uplink and physical uplink shared channel (PUSCH) transmission for unlicensed operation.

BACKGROUND

The New Radio (NR) standard in the $3^{rd}$ Generation Partnership Project (3GPP) is being designed to provide service for multiple use cases such as enhanced mobile broadband (eMBB), ultra-reliable and low latency communication (URLLC), and machine type communication (MTC). Each of these services has different technical requirements. For example, the general requirement for eMBB is high data rate with moderate latency and moderate coverage, while URLLC service requires a low latency and high reliability transmission but perhaps for moderate data rates.

One of the solutions for low latency data transmission is shorter transmission time intervals. In NR, in addition to transmission in a slot, a mini-slot transmission is also allowed to reduce latency. A mini-slot may consist of any number of 1 to 14 Orthogonal Frequency Division Multiplexing (OFDM) symbols. It should be noted that the concepts of slot and mini-slot are not specific to a specific service, meaning that a mini-slot may be used for either eMBB, URLLC, or other services.

FIG. 1 illustrates an exemplary radio resource in NR.

In Release 15 NR, a user equipment (UE) can be configured with up to four carrier bandwidth parts in the downlink (DL) with a single DL carrier bandwidth part being active at a given time. A UE can be configured with up to four carrier bandwidth parts in the uplink (UL) with a single UL carrier bandwidth part being active at a given time. If a UE is configured with a supplementary UL, the UE can, in addition, be configured with up to four carrier bandwidth parts in the supplementary UL with a single supplementary UL carrier bandwidth part being active at a given time.

For a carrier bandwidth part with a given numerology $\mu_i$, a contiguous set of physical resource blocks (PRBs) are defined and numbered from 0 to $N_{BWP,i}^{size}-1$, where i is the index of the carrier bandwidth part. A resource block (RB) is defined as 12 consecutive subcarriers in the frequency domain.

Multiple OFDM numerologies, $\mu$, are supported in NR as given by Table 1 below, where the subcarrier spacing, $\Delta f$, and the cyclic prefix (CP) for a carrier bandwidth part are configured by different higher layer parameters for DL and UL, respectively.

TABLE 1

Supported transmission numerologies.

| $\mu$ | $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

A DL physical channel corresponds to a set of resource elements carrying information originating from higher layers. The following DL physical channels are defined: Physical Downlink Shared Channel (PDSCH); Physical Broadcast Channel (PBCH); and Physical Downlink Control Channel (PDCCH). PDSCH is the main physical channel used for unicast DL data transmission, but also for transmission of random access response (RAR), certain system information blocks (SIBs), and paging information. PBCH carries the basic system information required by the UE to access the network. PDCCH is used for transmitting DL control information (DCI), mainly scheduling decisions, required for reception of PDSCH, and for UL scheduling grants enabling transmission on the Physical Uplink Shared Channel (PUSCH).

An UL physical channel corresponds to a set of resource elements carrying information originating from higher layers. The following UL physical channels are defined: PUSCH; Physical Uplink Control Channel (PUCCH); and Physical Random Access Channel (PRACH). PUSCH is the UL counterpart to the PDSCH. PUCCH is used by UEs to transmit UL control information, including Hybrid Automatic Repeat Request (HARM) acknowledgements, channel state information (CSI) reports, etc. PRACH is used for random access preamble transmission.

In general, a UE shall determine the RB assignment in frequency domain for PUSCH or PDSCH using the resource allocation field in the detected DCI carried in PDCCH. For PUSCH carrying msg3 in a random-access procedure, the frequency domain resource assignment is signaled by using the UL grant contained in RAR.

In NR, two frequency resource allocation schemes, type 0 and type 1, are supported for PUSCH and PDSCH. Which type to use for a PUSCH/PDSCH transmission is either defined by a radio resource control (RRC) configured parameter or indicated directly in the corresponding DCI or UL grant in RAR (for which type 1 is used).

The RB indexing for UL/DL type 0 and type 1 resource allocation is determined within the UE's active carrier bandwidth part, and the UE shall, upon detection of PDCCH intended for the UE, determine first the UL/DL carrier bandwidth part and then the resource allocation within the carrier bandwidth part. The UL bandwidth part for PUSCH carrying msg3 is configured by higher layer parameters.

For cell search and initial access, these channels are included: Synchronization Signal (SS)/PBCH block, PDSCH carrying Remaining Minimum System Information (RMSI)/RAR/MSG4 scheduled by PDCCH channels carrying DCI, PRACH channels and PUSCH channel carrying MSG3.

The synchronization signal and PBCH block (SS/PBCH block, or SSB in shorter format) comprises the above signals (Primary Synchronization Signal (PSS), Secondary Synchronization Signal (SSS), and PBCH Demodulation Reference Signal (DMRS)), and PBCH. The SSB may have 15 kHz, 30 kHz, 120 kHz or 240 kHz subcarrier spacing (SCS) depending on the frequency range.

In the 3GPP NR standard, DCI is received over PDCCH. The PDCCH may carry DCI in messages with different formats. DCI format 0_0 and 0_1 are DCI messages used to convey UL grants to the UE for transmission of the PUSCH. DCI format 1_0 and 1_1 are used to convey DL grants for transmission of the PDSCH. Other DCI formats (2_0, 2_1, 2_2 and 2_3) are used for other purposes such as transmission of slot format information, reserved resource, transmit power control information, etc.

A PDCCH candidate is searched within a common or UE-specific search space which is mapped to a set of time and frequency resources referred to as a control resource set (CORESET). The search spaces within which PDCCH candidates must be monitored are configured to the UE via RRC signaling. A monitoring periodicity is also configured for different PDCCH candidates. In any particular slot, the UE may be configured to monitor multiple PDCCH candidates in multiple search spaces which may be mapped to one or more CORESETs. PDCCH candidates may need to be monitored multiple times in a slot, once every slot or once in multiple of slots.

The smallest unit used for defining CORESETs is a Resource Element Group (REG), which is defined as spanning 1 PRB×1 OFDM symbol in frequency and time. Each REG contains DMRS to aid in the estimation of the radio channel over which that REG was transmitted. When transmitting the PDCCH, a precoder could be used to apply weights at the transmit antennas based on some knowledge of the radio channel prior to transmission. It is possible to improve channel estimation performance at the UE by estimating the channel over multiple REGs that are proximate in time and frequency if the precoder used at the transmitter for the REGs is not different. To assist the UE with channel estimation, the multiple REGs can be grouped together to form a REG bundle and the REG bundle size for a CORESET is indicated to the UE. The UE may assume that any precoder used for the transmission of the PDCCH is the same for all the REGs in the REG bundle. A REG bundle may consist of 2, 3 or 6 REGs.

A control channel element (CCE) consists of 6 REGs. The REGs within a CCE may either be contiguous or distributed in frequency. When the REGs are distributed in frequency, the CORESET is said to be using an interleaved mapping of REGs to a CCE and if the REGs are not distributed in frequency, a non-interleaved mapping is said to be used.

Interleaving can provide frequency diversity. Not using interleaving is beneficial for cases where knowledge of the channel allows the use of a precoder in a particular part of the spectrum improve the signal-to-interference-plus-noise ratio (SINR) at the receiver.

A PDCCH candidate may span 1, 2, 4, 8 or 16 CCEs. If more than one CCE is used, the information in the first CCE is repeated in the other CCEs. Therefore, the number of aggregated CCEs used is referred to as the aggregation level for the PDCCH candidate.

A hashing function is used to determine the CCEs corresponding to PDCCH candidates that a UE must monitor within a search space set. The hashing is done differently for different UEs so that the CCEs used by the UEs are randomized and the probability of collisions between multiple UEs for which PDCCH messages are included in a CORESET is reduced.

An NR slot consists of several OFDM symbols, according to current agreements either 7 or 14 symbols (OFDM subcarrier spacing ≤60 kHz) and 14 symbols (OFDM subcarrier spacing >60 kHz).

FIG. 2 illustrates an example subframe with 14 OFDM symbols. In FIG. 2, $T_s$ and $T_{symb}$ denote the slot and OFDM symbol duration, respectively. In addition, a slot may also be shortened to accommodate DL/UL transient period or both DL and UL transmissions.

FIG. 3 illustrates potential slot variations.

Furthermore, NR also defines Type B scheduling, also known as mini-slots. Mini-slots are shorter than slots (according to current agreements from 1 or 2 symbols up to number of symbols in a slot minus one) and can start at any symbol. Mini-slots are used if the transmission duration of a slot is too long or the occurrence of the next slot start (slot alignment) is too late. Applications of mini-slots include, among others, latency critical transmissions (in this case both mini-slot length and frequent opportunity of mini-slot are important) and unlicensed spectrum where a transmission should start immediately after listen-before-talk succeeded (here the frequent opportunity of mini-slot is especially important).

FIG. 4 illustrates an example of a mini-slot with 2 OFDM symbols.

NR supports two types of pre-configured resources, both of which are different flavors of existing Long Term Evolution (LTE) semi-persistent scheduling (SPS) with some further aspects such as supporting repetitions for a transport block (TB). In Type 1, UL data transmission with configured grant is only based on RRC (re)configuration without any L1 signaling. Type 2 is very similar to the LTE SPS feature. UL data transmission with configured grant is based on both RRC configuration and L1 signaling for activation/deactivation of the grant. The gNB needs to explicitly activate the configured resources on PDCCH, and the UE confirms the reception of the activation/deactivation grant with a Medium Access Control (MAC) control element.

Repetition of a TB is also supported in NR, and the same resource configuration is used for K repetitions for a TB including the initial transmission. The possible values of K are {1, 2, 4, 8}. Repetitions follow an RV sequence configured by UE-specific RRC signaling to one of the following: Sequence {0, 2, 3, 1} or {0, 3, 0, 3} or {0, 0, 0, 0}.

SUMMARY

Certain aspects of the present disclosure and their embodiments may provide solutions to these or other challenges. For example, certain embodiments provide methods for mapping of the UCI and for identification of a configured UL transmission.

According to certain embodiments, a method performed by a wireless device includes receiving a configuration for one or more data transmission starting positions for a configured uplink in unlicensed spectrum. The one or more data transmission starting positions include at least a first starting position. The method further includes performing an UL transmission at one of the one or more data transmission starting positions based on when the wireless device is able to access a channel. The UL transmission includes UCI multiplexed in a PUSCH. The UCI carries one or more parameters for unlicensed spectrum.

According to certain embodiments, a wireless device is configured to receive a configuration for one or more data transmission starting positions for a configured uplink in unlicensed spectrum. The one or more data transmission starting positions include at least a first starting position. The wireless device is further configured to perform an UL transmission at one of the one or more data transmission starting positions based on when the wireless device is able to access a channel. The UL transmission includes UCI multiplexed in a PUSCH. The UCI carries one or more parameters for unlicensed spectrum.

According to certain embodiments, a method performed by a network node includes sending a configuration for one or more data transmission starting positions for a configured UL in unlicensed spectrum, the one or more data transmission starting positions comprising at least a first starting position. An UL transmission is received. The UL transmission comprising UCI multiplexed in a PUSCH. The UCI carries one or more parameters for the unlicensed spectrum. A starting position is determined for the UL transmission from among the one or more data transmission starting positions.

According to certain embodiments, a network node is configured to send a configuration for one or more data transmission starting positions for a configured UL in unlicensed spectrum. The one or more data transmission starting positions comprising at least a first starting position. An UL transmission is received. The UL transmission comprising UCI multiplexed in a PUSCH. The UCI carries one or more parameters for the unlicensed spectrum. A starting position is determined for the UL transmission from among the one or more data transmission starting positions.

Certain embodiments may provide one or more of the following technical advantage(s). As one example, certain embodiments may advantageously allow the network node (e.g., gNB) to verify a valid configured UL transmission as early as possible. This advantageously provides more processing time for the network node to demodulate/decode the configured UL transmission. As another example, certain embodiments may enable multiple starting points, which advantageously enhances the channel access granularity of configured UL.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
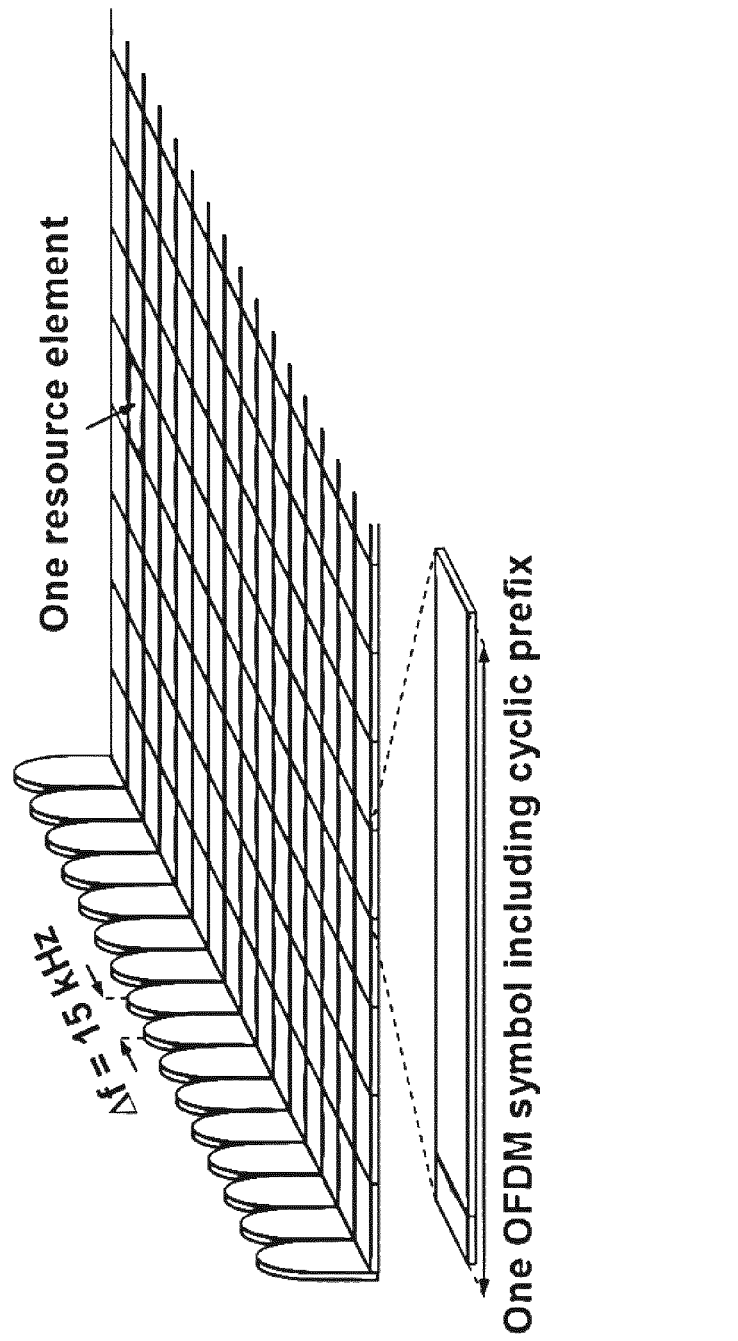
FIG. 1 illustrates an exemplary radio resource in NR.
Figure 2:
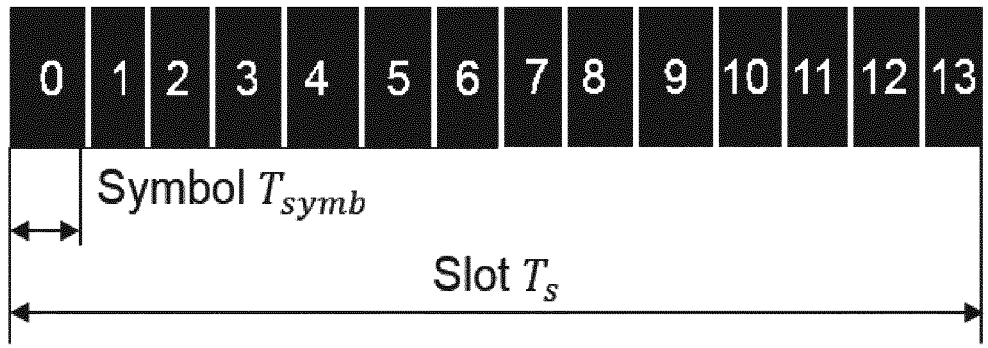
FIG. 2 illustrates an example subframe with 14 OFDM symbols.
Figure 3:
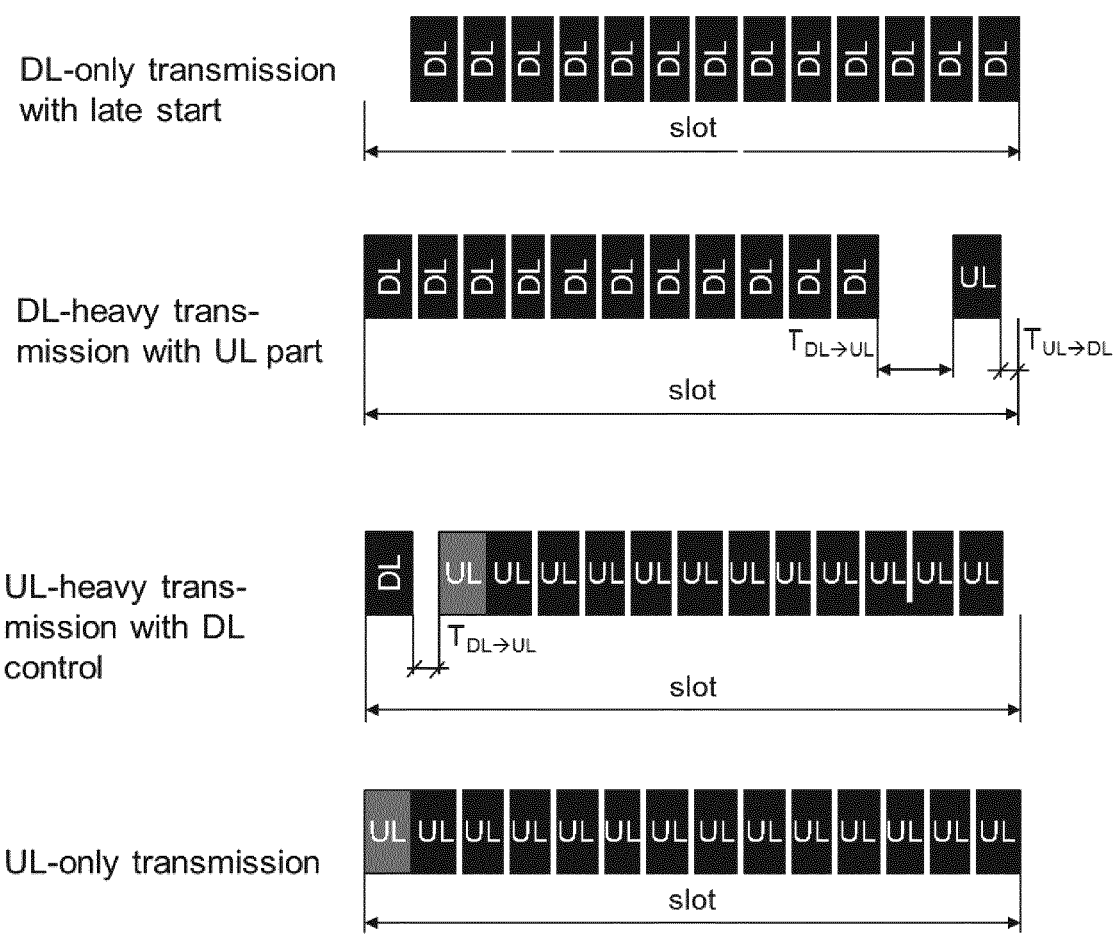
FIG. 3 illustrates potential slot variations.
Figure 4:
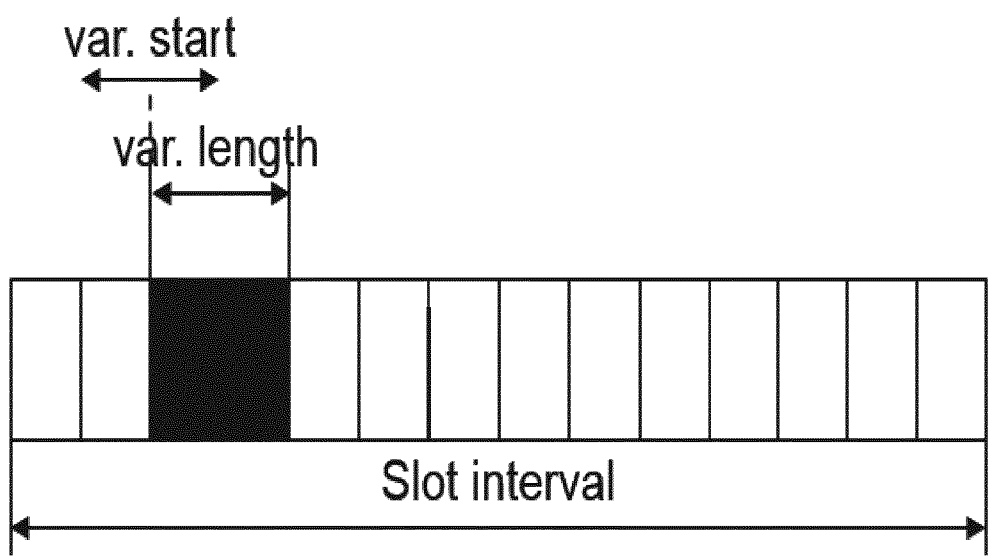
FIG. 4 illustrates an example of a mini-slot with 2 OFDM symbols.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

For a node to be allowed to transmit in unlicensed spectrum (e.g., the 5 GHz band), it typically needs to perform a clear channel assessment (CCA). This procedure typically includes sensing the medium to be idle for a number of time intervals. Sensing the medium to be idle can be done in different ways, such as using energy detection, preamble detection or using virtual carrier sensing, where the latter implies that the node reads control information from other transmitting nodes informing when a transmission ends. After sensing the medium idle, a node is typically allowed to transmit for a certain amount of time, sometimes referred to as transmission opportunity (TXOP). The length of the TXOP depends on regulation and the type of CCA that has been performed, but typically ranges from 1 ms to 10 MS.

The mini-slot concept in NR allows a node to access the channel at a much finer granularity compared to, for example, LTE Licensed Assisted Access (LAA), where the channel could only be accessed at 500 us intervals. Using, for example, 60 kHz SCS and a two symbol mini-slot in NR, the channel can be accessed at 36 us intervals.

There currently exist certain challenge(s). For example, NR-Unlicensed (NR-U) should support new UL control information (UCI) for configured UL that carries unlicensed operation parameters, similar to that proposed under the 3GPP work item for further enhancements to licensed assisted autonomous uplink UCI (feLAA AUL-UCI). Additionally, multiple starting positions help increase the channel access granularity. However, given that the gNB does not know when the UE will transmit on the configured UL resources, the gNB does not know when the UE will transmit for full or partial slot transmission. A method is needed to help the gNB detect the start of a configured UL transmission without significantly increasing the processing burden on the gNB.

In certain embodiments, a UE may be configured with multiple starting points for configured UL via RRC. Multiple starting points for configured UL can be configured by RRC in multiple ways. As one example, multiple starting points for configured UL can be configured by RRC in the form of a PUSCH starting position bitmap that indicates the symbol in which configured UL PUSCH may start. As another example, multiple starting points for configured UL can be configured by RRC in the form of PUSCH symbol indices in which configured UL PUSCH may start.

In certain embodiments, the UE prepares a transmission assuming the resources are available from a first possible starting point until the end of the slot. In certain embodiments, if the UE does not successfully access the channel at the first starting position, L1 processing can adapt the same transport block size (TBS) into a different amount of radio resources to accommodate multiple data transmission starting points based on the LBT outcome. Depending on the starting point used, the number of available resources may be different and hence different coding rate is resulted to fit the same scheduled TBS.

Alternatively, in certain embodiments the UE prepares the transmission assuming the resources are available from the first possible starting point until the end of the slot. If the UE does not successfully access the channel at the first starting position, the UE may puncture the processed transport block (TB) on available REs based on the LBT outcome (i.e., the TB is partially discarded).

In certain embodiments, front loaded DMRS are used to mark the start of the transmission (i.e., the transmission starts with DMRS symbol(s)).

In certain embodiments, UCI mapping starts from the immediate next symbol after the front loaded DMRS symbol(s).

The number of UCI coded symbols may be calculated in any suitable manner. As one example, in certain embodiments the number of UCI coded symbols may be calculated independent of the actual PUSCH length (in terms of coded blocks or symbols). As another example, the number of UCI coded symbols may be calculated assuming a PUSCH length equivalent to the duration from the first starting position until the end of the slot. Therefore, the length of UCI is fixed irrespective of the transmission starting position. In certain embodiments, the PUSCH length value may be RRC configured (and may not correspond to the actual PUSCH length).

As a non-limiting example, in certain embodiments UCI coded symbols length can be derived using the same equation used to calculate CSI bits with UL-SCH. However, number of PUSCH symbols is assumed to be fixed as shown in the above, and does not correspond to the actual PUSCH length for which the UCI corresponds:

$$Q'_{CSI-1} = \min\left\{\left\lceil\frac{(O_{CSI-1} + L_{CSI-1}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r}\right\rceil, \left\lceil\alpha \cdot \sum_{l=0}^{N_{symb,all}^{PUSCH}-1} M_{sc}^{UCI}(l)\right\rceil - Q'_{ACK}\right\}$$

Though this equation and others disclosed herein include parameters which are stated in terms of the CSI coded symbol length, it is recognized that the parameters may be replaced with parameters that are stated in term of configured grant UCI, for purposes of this disclosure. For example, throughout this disclosure, $Q'_{CSI-1}$ may be replaced with $Q'_{CG-UCI}$, $O_{CSI}$ may be replaced with $O_{CG-UCI}$, and so on.

According to another example embodiment, UCI coded symbol length can be derived using the same equation used to calculate CSI bits without UL-SCH.

$$Q'_{CSI-1} = \min\left\{\left\lceil\frac{(O_{CSI-1} + L_{CSI-1}) \cdot \beta_{offset}^{PUSCH}}{R \cdot Q_m}\right\rceil, \sum_{l=0}^{N_{symb,all}^{PUSCH}-1} M_{sc}^{UCI}(l) - Q'_{ACK}\right\},$$

where $Q_m$ and $R$ are the modulation and coding rate of the PUSCH. Again, the parameters may be replaced with parameters that are stated in term of configured grant UCI, for purposes of this disclosure. For example, $Q'_{CSI-1}$ may be replaced with $Q'_{CG-UCI-1}$, $O_{CSI}$ may be replaced with $O_{CG-UCI}$, and so on.

According to another example embodiment, UCI coded symbol length can be derived using the same equation as above, with the difference that for UCI generation the UE assumes a fixed length of PUSCH. For example, the PUSCH is assumed to start from the last starting position for the purpose of generation of UCI coded symbols UCI. As another example, the PUSCH is assumed to start from the first starting position for the purpose of generation of UCI coded symbols UCI. The UE shall not transmit a preconfigured grant PUSCH if preconfigured grant UCI coded symbols take up all radio resources. Alternatively, the UCI coded symbols are dropped if needed to fit in the radio resources for PUSCH transmission.

In a variation of the example embodiment above, the UE can be signaled for the purpose of generation of UCI coded symbols with an assumption on the starting symbol of the PUSCH and/or the order of the starting symbol (i.e., the 1$^{st}$ starting symbol or second starting symbols, etc.). The signaling may be accomplished in a variety of ways. As one example, the signaling can be done explicitly by RRC configurations or dynamically in DCI. As another example, the signaling can be done implicitly such as assuming the last starting symbol (as mentioned above), or the first, or the middle one, using floor or ceiling operations. In certain embodiments, the UE can also use a pre-defined rule to derive that from other parameters such as a scaling beta factor. Note that the actual starting symbol for PUSCH transmission may be determined based on the outcome of LBT procedure.

In certain embodiments, the network node (e.g., gNB) can use the number of UCI bits to determine a reference for the starting symbol that the UE can be used as an assumption for generation of UCI coded symbols to be transmitted.

According to another example embodiment, UCI coded symbols length can be derived from an equation completely independent of the PUSCH length, for example:

$$Q'_{CSI} = \left\lceil \frac{(O_{CSI} + L_{CSI}) \cdot \beta_{offset}^{PUSCH}}{R \cdot Q_m} \right\rceil$$

Again, the parameters may be replaced with parameters that are stated in term of configured grant UCI, for purposes of this disclosure. For example, Q may be replaced with Q'$_{CG-UCI}$, O$_{CSI}$ may be replaced with O$_{CG-UCI}$, and so on.

In certain embodiments, the UE shall not transmit a preconfigured grant PUSCH if preconfigured grant UCI coded symbols take up all radio resources.

In another variant of the previous embodiment, the UCI coded symbols may be dropped if needed to fit in the radio resources for PUSCH transmission.

In another variant of the previous embodiment, the UCI coded and PUSCH symbols may be dropped if UCI coded symbols take up all the radio resources or do not fit in the remaining radio resources with the slot Note that in the above equations:
- O$_{CSI-1}$ is the number of bits for CSI part 1; when the equation is used for calculating the configured grant UCI coded bit length, this quantity represents the number of bits for the configured grant UCI;
- O$_{CSI}$ is the number of bits for the configured grant UCI;
- if O$_{CSI-1}$≥360, L$_{CSI-1}$=11; otherwise L$_{CSI-1}$ is the number of CRC bits for CSI part 1, e.g. determined according to Subclause 6.3.1.2.1 of 3GPP TS 38.212 V15.3.0;
- $\beta_{offset}^{PUSCH} = \beta_{offset}^{CSI-part1}$;
- C$_{UL-SCH}$ is the number of code blocks for UL-SCH of the PUSCH transmission;
- if the DCI format scheduling the PUSCH transmission includes a CBGTI field indicating that the UE shall not transmit the r-th code block, K$_r$=0; otherwise, K$_r$ is the r-th code block size for UL-SCH of the PUSCH transmission;
- M$_{sc}^{PUSCH}$ is the scheduled bandwidth of the PUSCH transmission, expressed as a number of subcarriers;
- M$_{sc}^{PT-RS}$ (l) is the number of subcarriers in OFDM symbol l that carries PTRS, in the PUSCH transmission;
- Q'$_{ACK}$ is the number of coded modulation symbols per layer for HARQ-ACK transmitted on the PUSCH if number of HARQ-ACK information bits is more than 2, and $$Q'_{ACK} = \sum_{l=0}^{N_{symb,all}^{PUSCH}-1} \overline{M}_{sc,rvd}^{ACK}(l)$$

if the number of HARQ-ACK information bits is no more than 2 bits, where $\overline{M}_{sc,rvd}^{ACK}$ (l) is the number of reserved resource elements for potential HARQ-ACK transmission in OFDM symbol l, for l=0, 1, 2, . . . , N$_{symball}^{PUSCH}$−1, in the PUSCH transmission, e.g. defined in Subclause 6.2.7 of 3GPP TS 38.212 V15.3.0;

- M$_{sc}^{UCI}$(l) is the number of resource elements that can be used for transmission of UCI in OFDM symbol l, for l=0, 1, 2, . . . , N$_{symball}^{PUSCH}$−1, in the PUSCH transmission and N$_{symball}^{PUSCH}$ is the total number of OFDM symbols of the PUSCH, including all OFDM symbols used for DMRS;
- for any OFDM symbol that carries DMRS of the PUSCH, M$_{sc}^{UCI}$(l)=0;
- for any OFDM symbol that does not carry DMRS of the PUSCH, M$_{sc}^{UCI}$(l)=M$_{sc}^{PUSCH}$−M$_{sc}^{PT-RS}$(l);
- α is configured by higher layer parameter scaling; and
- Q$_m$ and R are the modulation and coding rate of the PUSCH.

Again, the parameters may be replaced with parameters that are stated in term of configured grant UCI, for purposes of this disclosure. For example, Q'$_{CSI-1}$ may be replaced with Q'$_{CG-UCI}$, O$_{CSI}$ may be replaced with O$_{CG-UCI}$, and so on.

Figure 5:
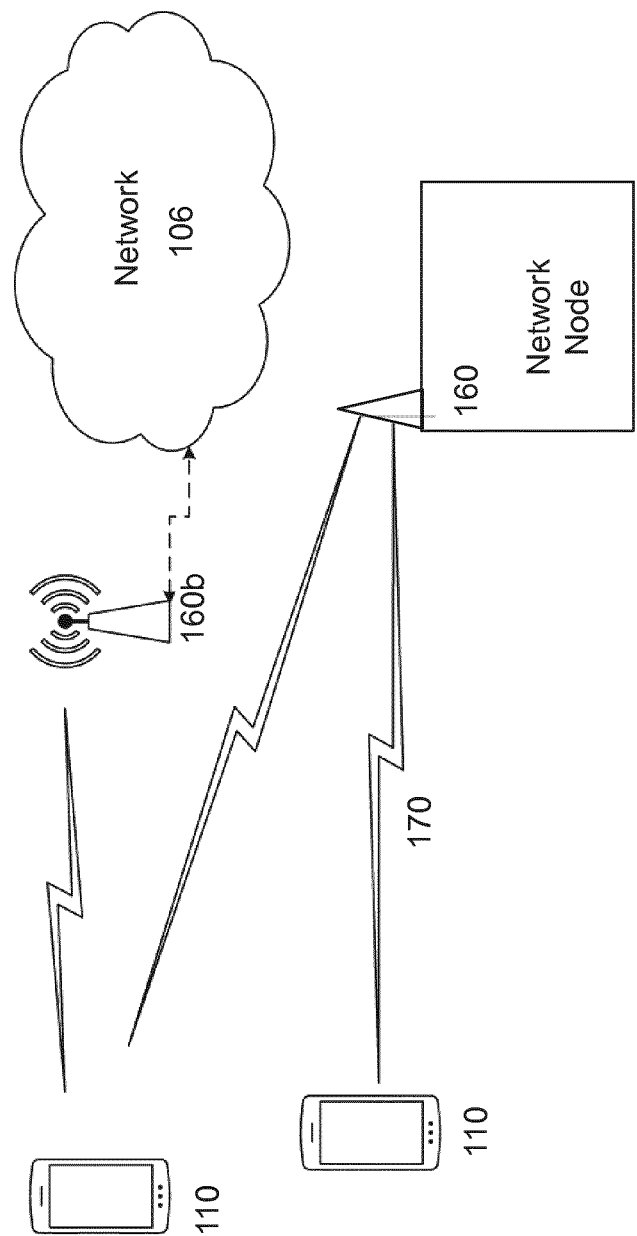
FIG. 5 illustrates an example wireless network, according to certain embodiments.

FIG. 5 illustrates a wireless network, in accordance with some embodiments. Although the subject matter described herein may be implemented in any appropriate type of system using any suitable components, the embodiments disclosed herein are described in relation to a wireless network, such as the example wireless network illustrated in FIG. 5. For simplicity, the wireless network of FIG. 1 only depicts network 106, network nodes 160 and 160b, and wireless devices 110. In practice, a wireless network may further include any additional elements suitable to support communication between wireless devices or between a wireless device and another communication device, such as a landline telephone, a service provider, or any other network node or end device. Of the illustrated components, network node 160 and wireless device 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and wireless device 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 6:
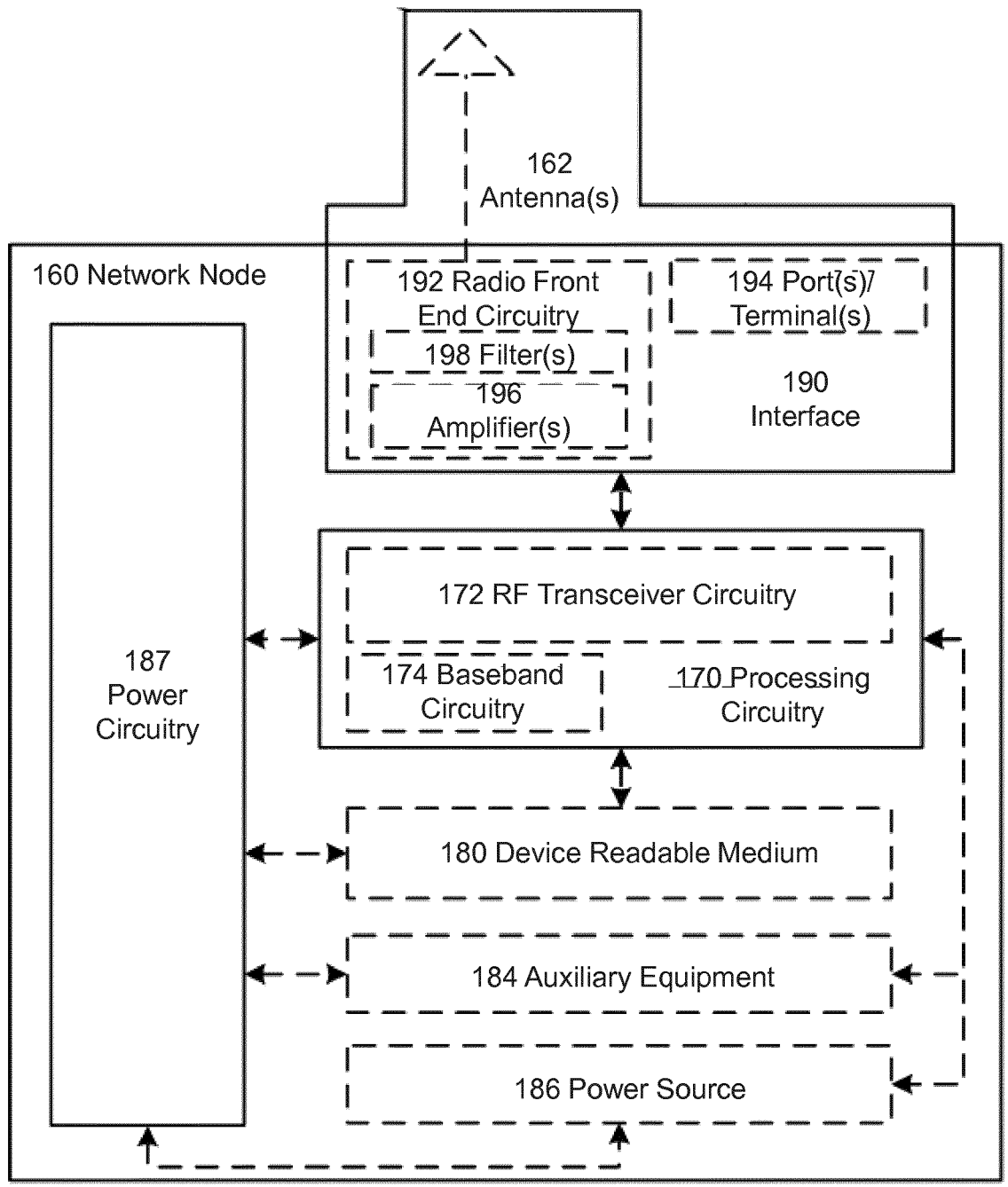
FIG. 6 illustrates an example network node, according to certain embodiments.

FIG. 6 illustrates an example network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O & M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 160 includes processing circuitry 170, device readable medium 180, interface 190, auxiliary equipment 184, power source 186, power circuitry 187, and antenna 162. Although network node 160 illustrated in the example wireless network of FIG. 5 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

According to certain embodiments, for example, processing circuitry 170 of network node 160 may be configured to send a configuration for one or more data transmission starting positions for a configured UL in unlicensed spectrum. The one or more data transmission starting positions comprising at least a first starting position. Processing circuitry 170 is further configured to receive an UL transmission. The UL transmission comprising UCI multiplexed in a PUSCH. The UCI carries one or more parameters for the unlicensed spectrum. A starting position is determined for the UL transmission from among the one or more data transmission starting positions.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or wireless devices 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or wireless devices via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 1 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 7:
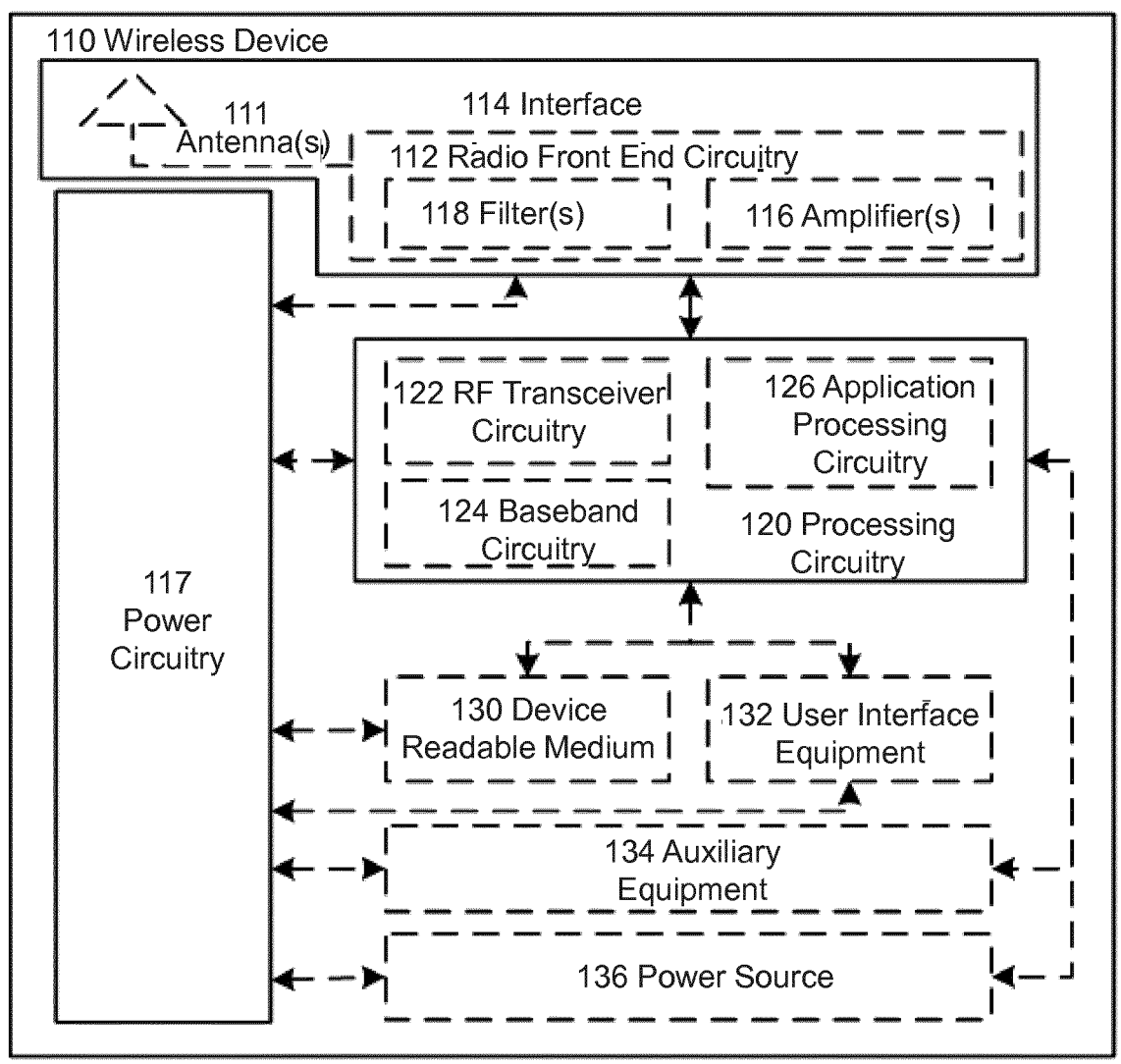
FIG. 7 illustrates an example wireless device, according to certain embodiments.

FIG. 7 illustrates a wireless device 110, according to certain embodiments. As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. Wireless device 110 may include multiple sets of one or more of the illustrated components for different wireless technologies supported by wireless device 110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 110.

Antenna 111 may include one or more antennas or antenna arrays, configured to send and/or receive wireless signals, and is connected to interface 114. In certain alternative embodiments, antenna 111 may be separate from wireless device 110 and be connectable to wireless device 110 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, wireless device 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components. Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 110 components, such as device readable medium 130, wireless device 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of wireless device 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a wireless device may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of wireless device 110, but are enjoyed by wireless device 110 as a whole, and/or by end users and the wireless network generally.

Processing circuitry 120 may be configured to perform any determining, calculating, or similar operations (e.g., certain obtaining operations) described herein as being performed by a wireless device. These operations, as performed by processing circuitry 120, may include processing information obtained by processing circuitry 120 by, for example, converting the obtained information into other information, comparing the obtained information or converted information to information stored by wireless device 110, and/or performing one or more operations based on the obtained information or converted information, and as a result of said processing making a determination.

According to certain embodiments, for example, processing circuitry 120 of wireless device 110 may be configured to receive a configuration for one or more data transmission starting positions for a configured uplink in unlicensed spectrum. The one or more data transmission starting positions include at least a first starting position. The processing circuitry 120 may be further configured to perform an UL transmission at one of the one or more data transmission starting positions based on when the wireless device is able to access a channel. The UL transmission includes UCI multiplexed in a PUSCH. The UCI carries one or more parameters for unlicensed spectrum.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with wireless device 110. Such interaction may be of many forms, such as visual, audial, tactile, etc. User interface equipment 132 may be operable to produce output to the user and to allow the user to provide input to wireless device 110. The type of interaction may vary depending on the type of user interface equipment 132 installed in wireless device 110. For example, if wireless device 110 is a smart phone, the interaction may be via a touch screen; if wireless device 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into wireless device 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from wireless device 110, and to allow processing circuitry 120 to output information from wireless device 110. User interface equipment 132 may include, for example, a speaker, a display, vibrating circuitry, a USB port, a headphone interface, or other output circuitry. Using one or more input and output interfaces, devices, and circuits, of user interface equipment 132, wireless device 110 may communicate with end users and/or the wireless network, and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. wireless device 110 may further comprise power circuitry 137 for delivering power from power source 136 to the various parts of wireless device 110 which need power from power source 136 to carry out any functionality described or indicated herein. Power circuitry 137 may in certain embodiments comprise power management circuitry. Power circuitry 137 may additionally or alternatively be operable to receive power from an external power source; in which case wireless device 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of wireless device 110 to which power is supplied.

Figure 8:
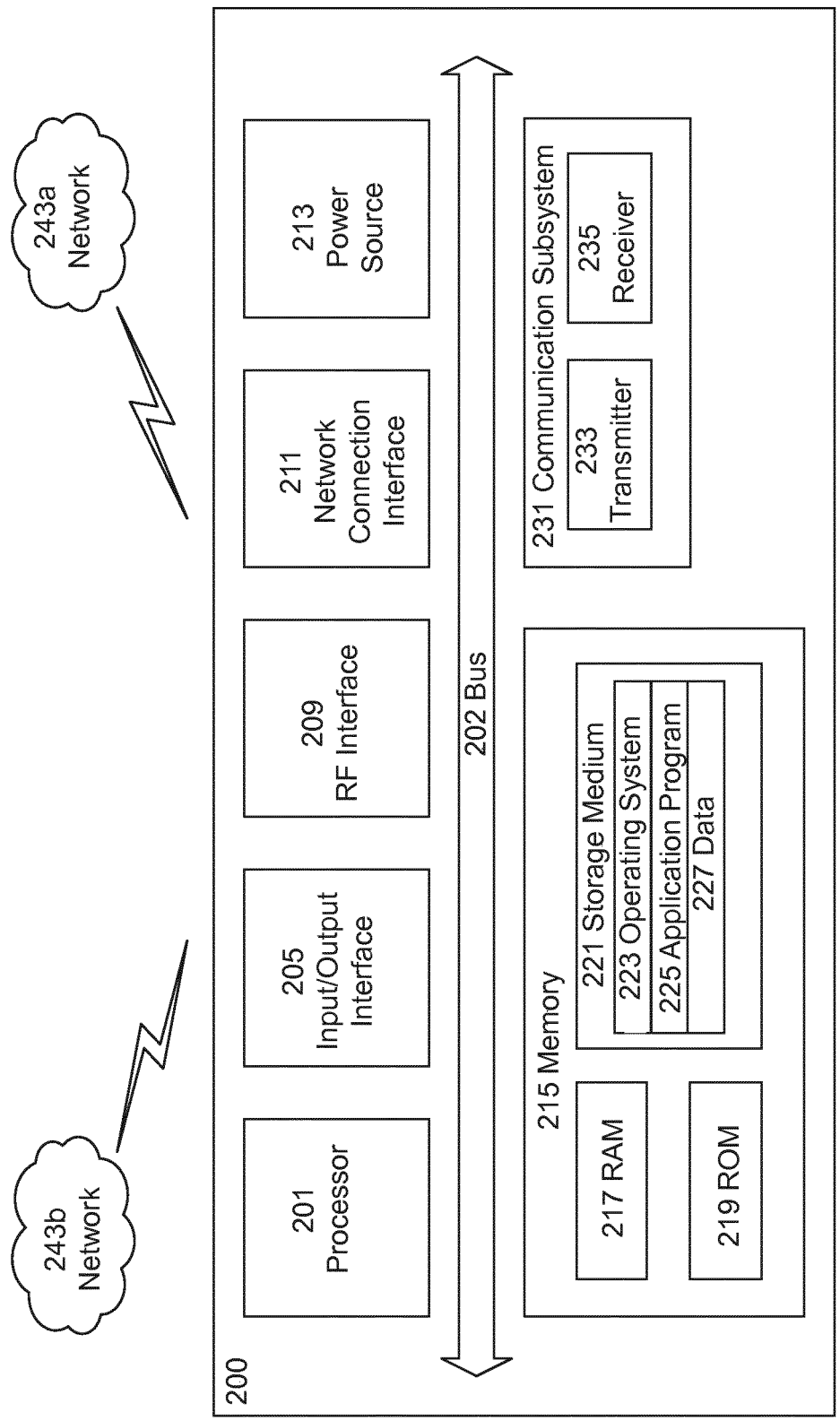
FIG. 8 illustrate an example user equipment, according to certain embodiments.

FIG. 8 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 8, is one example of a wireless device configured for communication in accordance with one or more communication standards promulgated by the $3^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 8 is a UE, the components discussed herein are equally applicable to a wireless device, and vice-versa.

In FIG. 8, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 8, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another wireless device, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 9:
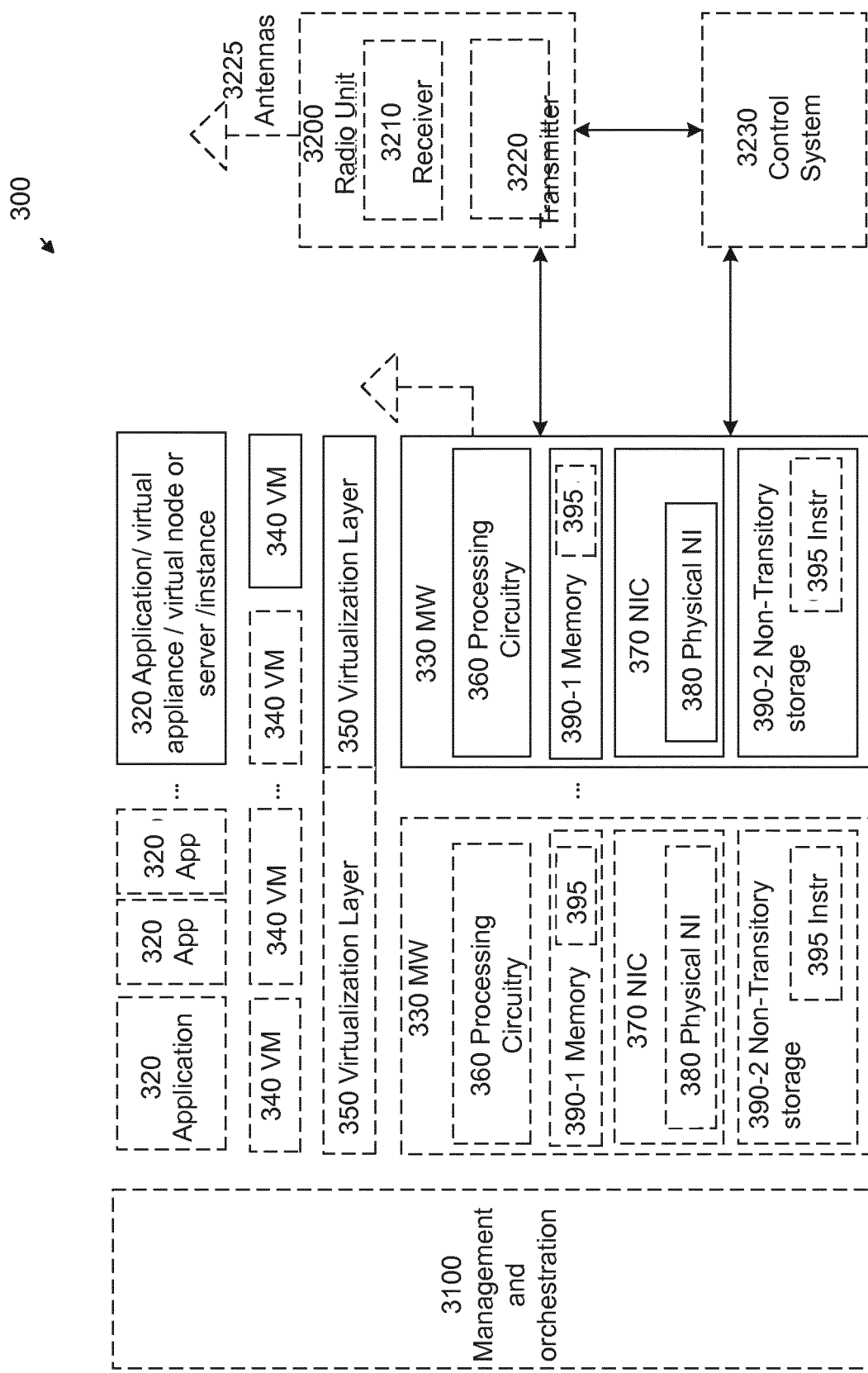
FIG. 9 illustrates a virtualization environment in which functions implemented by some embodiments may be virtualized, according to certain embodiments.

FIG. 9 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 9, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 9.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 10:
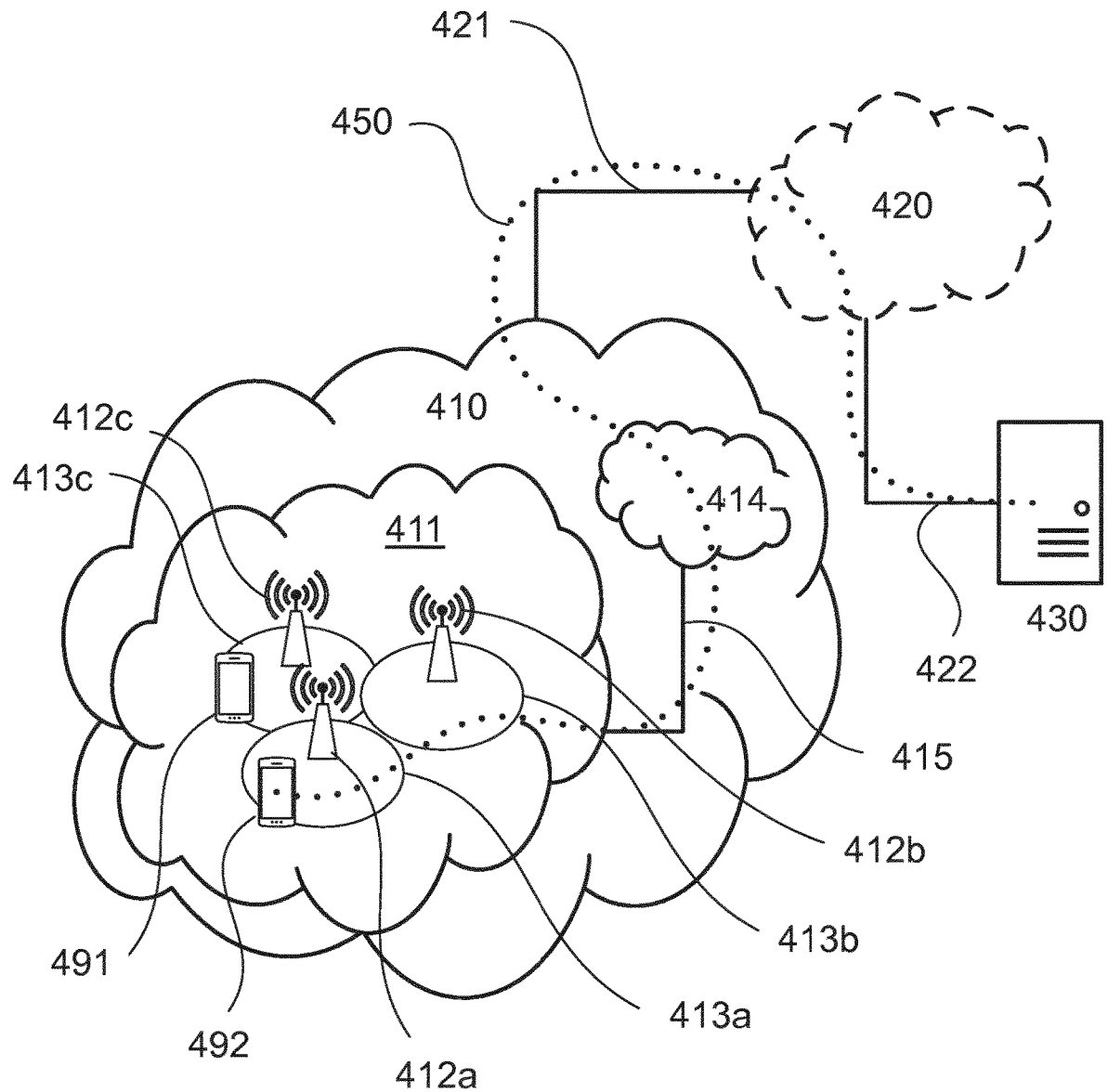
FIG. 10 illustrates a telecommunication network connected via an intermediate network to a host computer, according to certain embodiments.

FIG. 10 illustrates a telecommunication network connected via an intermediate network to a host computer in accordance with some embodiments. With reference to FIG. 10, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 10 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 11:
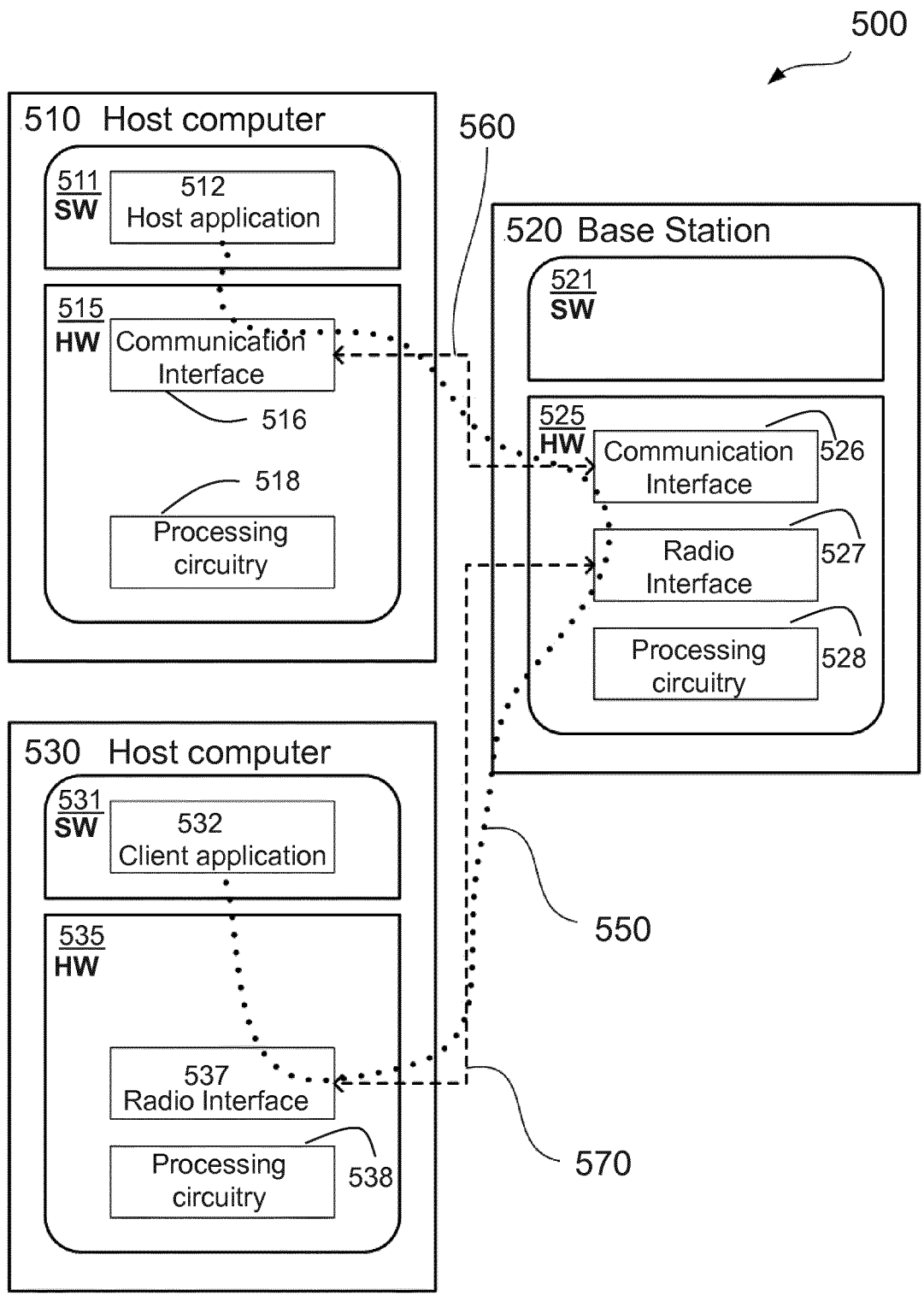
FIG. 11 illustrates a generalized block diagram of a host computer communicating via a base station with a user equipment over a partially wireless connection, according to certain embodiments.

FIG. 11 illustrates a host computer communicating via a base station with a user equipment over a partially wireless connection in accordance with some embodiments. Example implementations, in accordance with an embodiment, of the UE, base station and host computer discussed in the preceding paragraphs will now be described with reference to FIG. 11. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 11) served by base station 520. Communication interface 526 may be configured to facilitate connection 560 to host computer 510. Connection 560 may be direct or it may pass through a core network (not shown in FIG. 11) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 11 may be similar or identical to host computer 430, one of base stations 412a, 412b, 412c and one of UEs 491, 492 of FIG. 10, respectively. This is to say, the inner workings of these entities may be as shown in FIG. 10 and independently, the surrounding network topology may be that of FIG. 9.

In FIG. 11, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figures 12, 13:
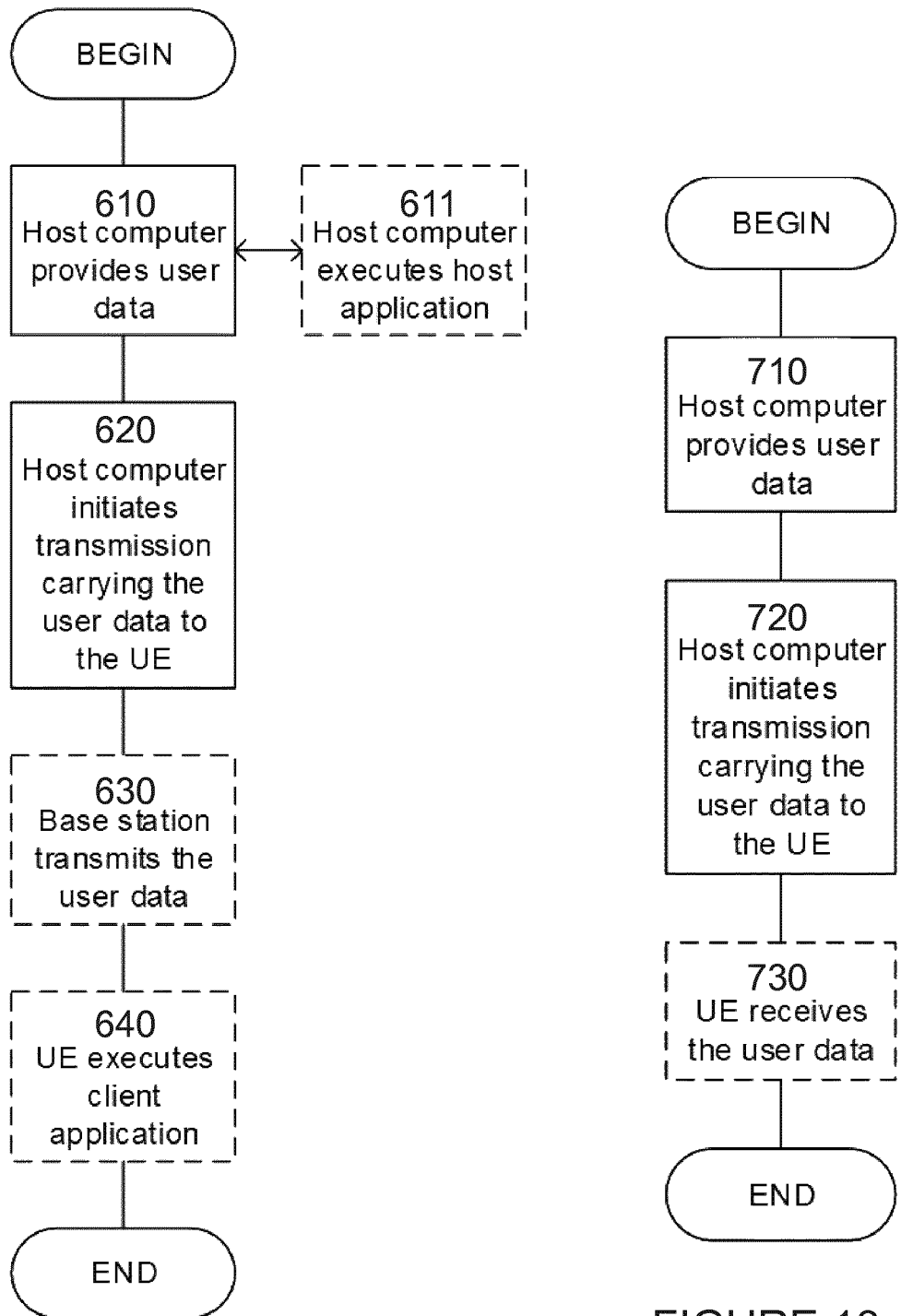
FIG. 12 illustrates a method implemented in a communication system, according to one embodiment.
FIG. 13 illustrates another method implemented in a communication system, according to one embodiment.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figures 14, 15:
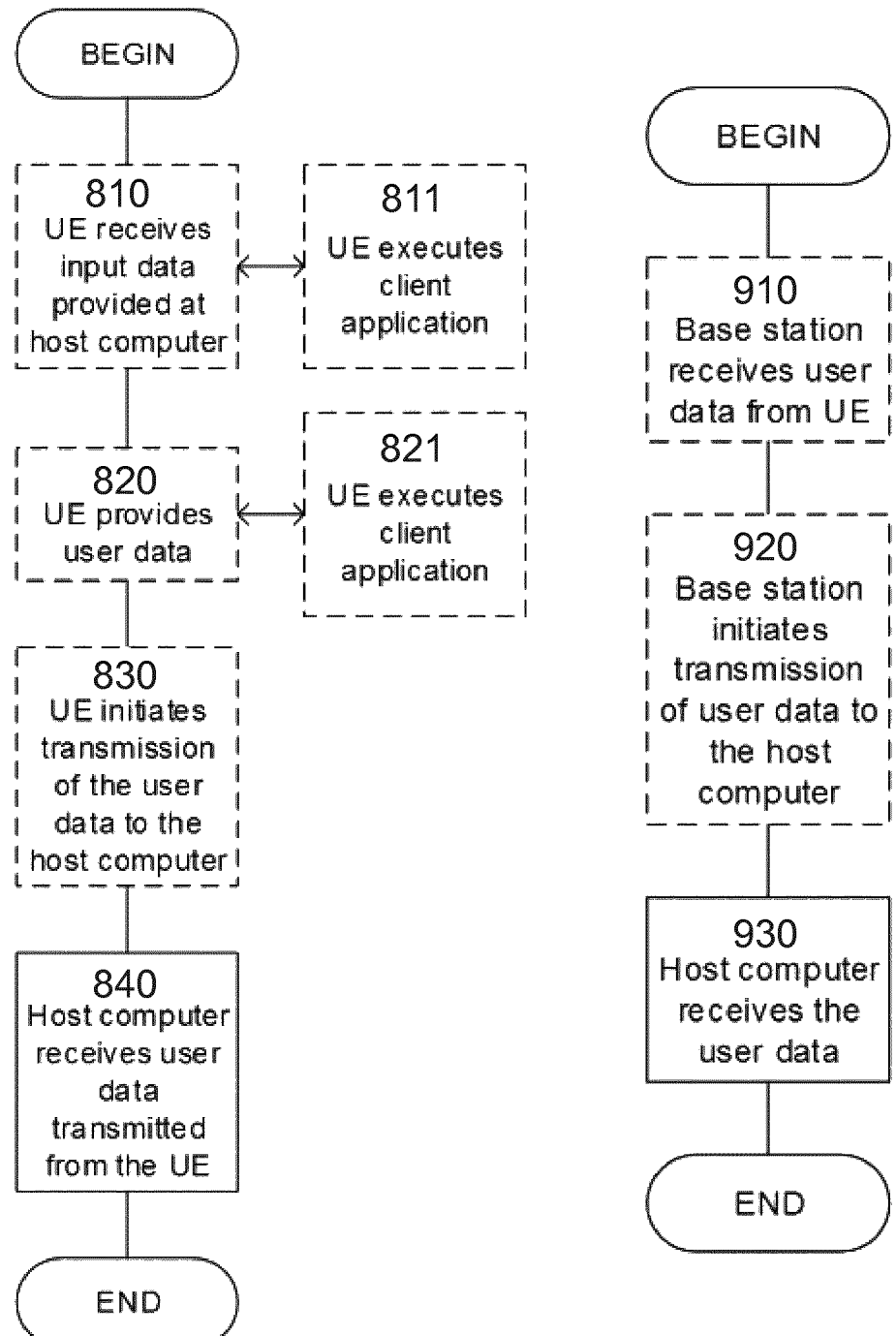
FIG. 14 illustrates another method implemented in a communication system, according to one embodiment.
FIG. 15 illustrates another method implemented in a communication system, according to one embodiment.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 15 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 15 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Figure 16:
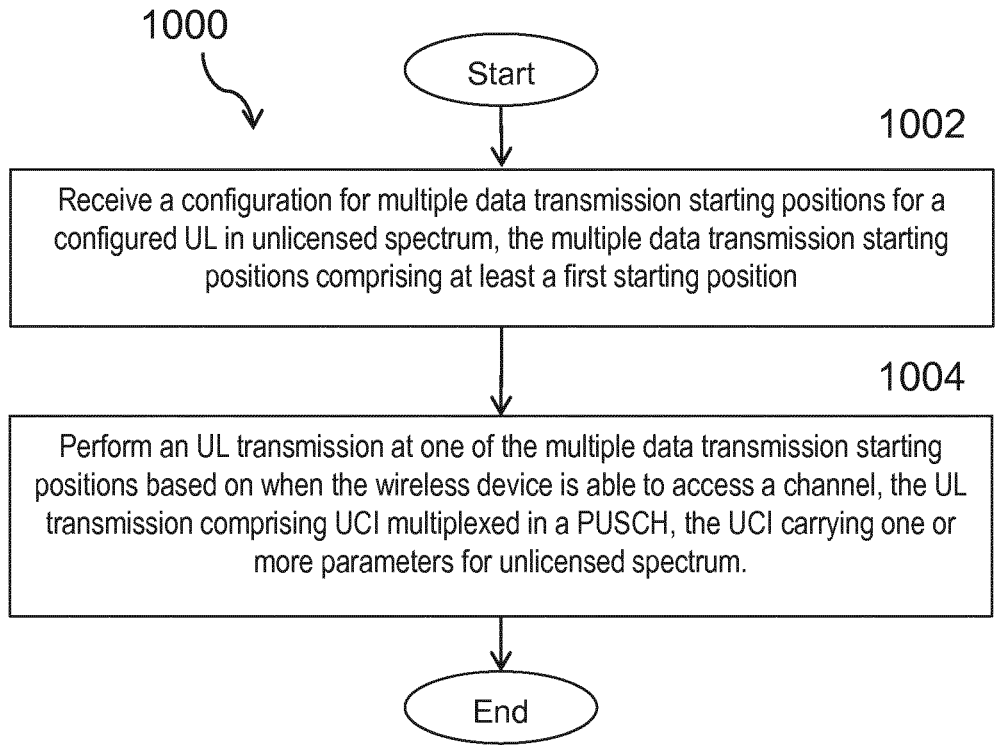
FIG. 16 illustrates an example method by a wireless device, according to certain embodiments.

FIG. 16 depicts a method 1000 in a wireless device, in accordance with particular embodiments. The method begins at step 1002, where the wireless device receives a configuration for multiple data transmission starting positions for a configured UL in unlicensed spectrum, the multiple data transmission starting positions comprising at least a first starting position.

In certain embodiments, the method may comprise preparing the UL transmission assuming that resources are available from the first starting position until the end of a slot.

In certain embodiments, the method may comprise performing a listen-before-talk (LBT) procedure in connection with an attempt to access the channel, and determining that the wireless device cannot access the channel at the first starting position based on an outcome of the LBT procedure. In certain embodiments, the method may comprise, in response to determining that the wireless device cannot access the channel at the first starting position, adapting a TBS of the UL transmission into a different amount of radio resources to accommodate a second starting position of the multiple data transmission starting positions. In certain embodiments, the method may comprise, in response to determining that the wireless device cannot access the channel at the first starting position, puncturing a processed TB on available resource elements.

At step 1004, the wireless device performs an UL transmission at one of the multiple data transmission starting positions based on when the wireless device is able to access a channel, the UL transmission comprising UCI multiplexed in a PUSCH, the UCI carrying one or more parameters for unlicensed spectrum.

In certain embodiments, the UL transmission may start with a DMRS symbol. In certain embodiments, UCI mapping may start from an immediate next symbol in the UL transmission after the DMRS symbol.

In certain embodiments, the method may comprise generating one or more UCI coded symbols. In certain embodiments, the method may comprise receiving a signal indicating an assumed starting symbol of the PUSCH for generating UCI coded symbols. In certain embodiments, a number of UCI coded symbols may be calculated independent of an actual length of the PUSCH. In certain embodiments, a number of UCI coded symbols may be calculated assuming a PUSCH length equivalent to a duration from a starting position of the UL transmission to an end of a slot.

In certain embodiments, UCI coded symbol length may be derived using the equation:

$$Q'_{CSI-1} = \min\left\{\left\lceil\frac{(O_{CSI-1} + L_{CSI-1}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r}\right\rceil,\right.$$

$$\left.\left\lceil\alpha \cdot \sum_{l=0}^{N_{symb,all}^{PUSCH}-1} M_{sc}^{UCI}(l)\right\rceil - Q'_{ACK}\right\}$$

Again, the parameters may be replaced with parameters that are stated in term of configured grant UCI, for purposes of this disclosure. For example, $Q'_{CSI-1}$ may be replaced with $Q'_{CG\text{-}UCI}$, $O_{CSI}$ may be replaced with $O_{CG\text{-}UCI}$, and so on.

In certain embodiments, a number of PUSCH symbols may be assumed to be fixed and may not correspond to an actual length of the PUSCH for which the UCI corresponds.

In certain embodiments, UCI coded symbol length may be derived using the equation:

$$Q'_{CSI-1} = \min\left\{\left\lceil\frac{(O_{CSI-1} + L_{CSI-1}) \cdot \beta_{offset}^{PUSCH}}{R \cdot Q_m}\right\rceil, \sum_{l=0}^{N_{symb,all}^{PUSCH}-1} M_{sc}^{UCI}(l) - Q'_{ACK}\right\},$$

wherein $Q_m$ and R are a modulation and a coding rate of the PUSCH. In certain embodiments, a length of the PUSCH may be assumed to be fixed. Again, the parameters may be replaced with parameters that are stated in term of configured grant UCI, for purposes of this disclosure. For example, $Q'_{CSI-1}$ may be replaced with $Q'_{CG-UCI}$, $O_{CSI}$ may be replaced with $O_{CG-UCI}$, and so on.

In certain embodiments, UCI coded symbol length may be derived using the equation:

$$Q'_{CSI} = \left\lceil \frac{(O_{CSI} + L_{CSI}) \cdot \beta^{PUSCH}_{offset}}{R \cdot Q_m} \right\rceil$$

In certain embodiments, the method may comprise dropping one or more UCI coded symbols.

Figure 17:
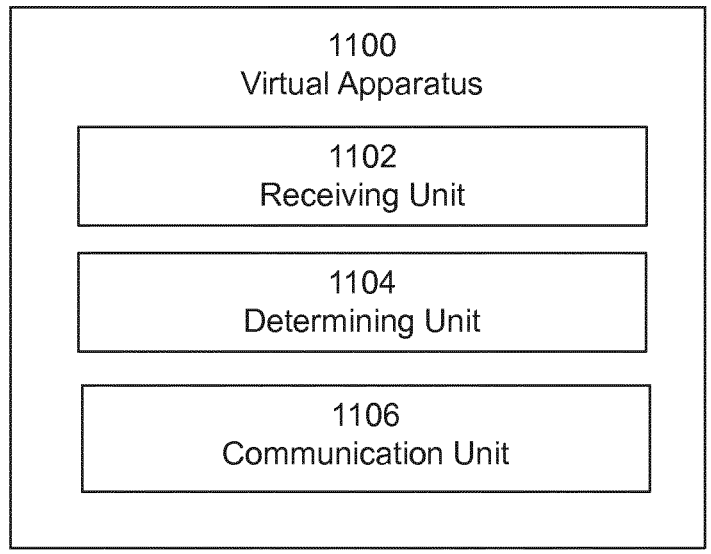
FIG. 17 illustrates an exemplary virtual computing device, according to certain embodiments.

FIG. 17 illustrates a schematic block diagram of a virtual apparatus 1100 in a wireless network (for example, the wireless network shown in FIG. 5). The apparatus may be implemented in a wireless device (e.g., wireless device 110 shown in FIG. 5). Apparatus 1100 is operable to carry out the example method described with reference to FIG. 16 and possibly any other processes or methods disclosed herein. It is also to be understood that the method of FIG. 16 is not necessarily carried out solely by apparatus 1100. At least some operations of the method can be performed by one or more other entities.

Virtual Apparatus 1100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1102, determining unit 1104, communication unit 1106, and any other suitable units of apparatus 1100 to perform corresponding functions according one or more embodiments of the present disclosure.

In certain embodiments, apparatus 1100 may be a UE. As illustrated in FIG. 17, apparatus 1100 includes receiving unit 1102, determining unit 1104, and communication unit 1106. Receiving unit 1102 may be configured to perform the receiving functions of apparatus 1100. For example, receiving unit 1102 may be configured to receive a configuration for multiple data transmission starting positions for a configured UL in unlicensed spectrum, the multiple data transmission starting positions comprising at least a first starting position. As another example, receiving unit 1102 may be configured to receive a signal indicating an assumed starting symbol of the PUSCH for generating UCI coded symbols.

Receiving unit 1102 may receive any suitable information (e.g., from a wireless device or another network node). Receiving unit 1102 may include a receiver and/or a transceiver, such as RF transceiver circuitry 122 described above in relation to FIG. 7. Receiving unit 1102 may include circuitry configured to receive messages and/or signals (wireless or wired). In particular embodiments, receiving unit 1102 may communicate received messages and/or signals to determining unit 1104 and/or any other suitable unit of apparatus 1100. The functions of receiving unit 1102 may, in certain embodiments, be performed in one or more distinct units.

Determining unit 1104 may perform the processing functions of apparatus 1100. For example, determining unit 1104 may be configured to prepare the UL transmission assuming that resources are available from the first starting position until the end of a slot. As another example, determining unit 1104 may be configured to perform an LBT procedure in connection with an attempt to access the channel, and determine that the wireless device cannot access the channel at the first starting position based on an outcome of the LBT procedure. As still another example, determining unit 1104 may be configured to, in response to determining that the wireless device cannot access the channel at the first starting position, adapt a TBS of the UL transmission into a different amount of radio resources to accommodate a second starting position of the multiple data transmission starting positions. As yet another example, determining unit 1104 may be configured to, in response to determining that the wireless device cannot access the channel at the first starting position, puncture a processed TB on available resource elements. As another example, determining unit 1104 may be configured to generate one or more UCI coded symbols. As another example, determining unit 1104 may be configured to derive UCI coded symbol length. As another example, determining unit 1104 may be configured to drop one or more UCI coded symbols.

Determining unit 1104 may include or be included in one or more processors, such as processing circuitry 120 described above in relation to FIG. 1. Determining unit 1104 may include analog and/or digital circuitry configured to perform any of the functions of determining unit 1104 and/or processing circuitry 120 described above. The functions of determining unit 1104 may, in certain embodiments, be performed in one or more distinct units.

Communication unit 1106 may be configured to perform the transmission functions of apparatus 1100. For example, communication unit 1106 may be configured to perform an UL transmission at one of the multiple data transmission starting positions based on when the wireless device is able to access a channel, the UL transmission comprising UCI multiplexed in a PUSCH, the UCI carrying one or more parameters for unlicensed spectrum Communication unit 1106 may transmit messages (e.g., to a wireless device and/or another network node). Communication unit 1106 may include a transmitter and/or a transceiver, such as RF transceiver circuitry 122 described above in relation to FIG. 7. Communication unit 1106 may include circuitry configured to transmit messages and/or signals (e.g., through wireless or wired means). In particular embodiments, communication unit 1106 may receive messages and/or signals for transmission from determining unit 1104 or any other unit of apparatus 1100. The functions of communication unit 1104 may, in certain embodiments, be performed in one or more distinct units.

Figure 18:
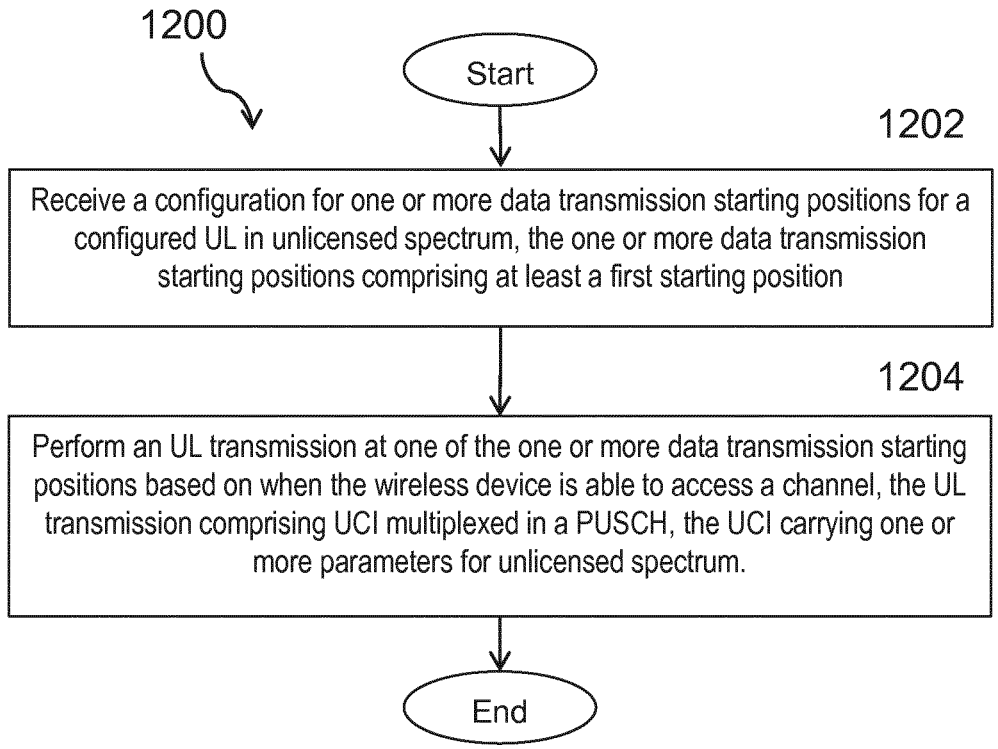
FIG. 18 illustrates another example method by a wireless device, according to certain embodiments.

FIG. 18 depicts a method 1200 in a wireless device, in accordance with particular embodiments. The method begins at step 1202, where the wireless device receives a configuration for one or more data transmission starting positions for a configured UL in unlicensed spectrum. The one or more data transmission starting positions comprising at least a first starting position. At step 1204, the wireless device performs an UL transmission at one of the one or more data transmission starting positions based on when the wireless device 110 is able to access a channel. The UL transmission comprises UCI multiplexed in a PUSCH. The UCI carries one or more parameters for unlicensed spectrum.

In a particular embodiment, the method includes preparing the UL transmission assuming that resources are available from the first starting position.

In a particular embodiment, the UL transmission starts with a demodulation reference signal symbol.

In a particular embodiment, a UCI mapping starts from an immediate next symbol in the UL transmission after a demodulation reference signal symbol.

In a particular embodiment, a number of UCI coded symbols is calculated independent of an actual length of the PUSCH.

In a particular embodiment, a number of UCI coded symbols is calculated assuming a PUSCH length equivalent to a duration from a starting position of the UL transmission to an end of a slot.

In a particular embodiment, the one or more parameters comprise a UCI coded symbol length that is derived using an equation similar to the following equation which is used to derive a CSI coded symbol length:

$$Q'_{CSI-1} = \min \left\{ \left\lceil \frac{(O_{CSI-1} + L_{CSI-1}) \cdot \beta^{PUSCH}_{offset} \cdot \sum_{l=0}^{N^{PUSCH}_{symb,all}-1} M^{UCI}_{sc}(l)}{\sum_{r=0}^{C_{UL-SCH}-1} K_r} \right\rceil, \right.$$

$$\left. \left\lceil \alpha \cdot \sum_{l=0}^{N^{PUSCH}_{symb,all}-1} M^{UCI}_{sc}(l) \right\rceil - Q'_{ACK} \right\}$$

wherein:

$O_{CSI-1}$ represents a number of bits for a configured grant UCI;

$O_{CSI}$ is a number of bits for a configured grant UCI;

if $O_{CSI-1} \geq 360$, $L_{CSI-1}=11$; otherwise $L_{CSI-1}$ is a number of CRC bits for CSI part 1, e.g. determined according to Subclause 6.3.1.2.1 of 3GPP TS 38.212 V15.3.0;

$\beta^{PUSCH}_{offset} = \beta^{CSI-part1}_{offset}$;

$C_{UL-SCH}$ is a number of code blocks for an uplink shared channel (UL-SCH) of the UL transmission on the PUSCH;

if a downlink control information (DCI) format scheduling the UL transmission on the PUSCH includes a CBGTI field indicating that the wireless device shall not transmit the r-th code block, $K_r=0$; otherwise, $K_r$ is the r-th code block size for the UL-SCH of the transmission on the PUSCH;

$Q'_{ACK}$ is a number of coded modulation symbols per layer for HARQ-ACK transmitted on the PUSCH if a number of HARQ-ACK information bits is more than 2, and $$Q'_{ACK} = \sum_{l=0}^{N^{PUSCH}_{symb,all}-1} \overline{M}^{ACK}_{sc,rvd}(l)$$

if the number of HARQ-ACK information bits is no more than 2 bits, where $\overline{M}^{ACK}_{sc,rvd}(l)$ is the number of reserved resource elements for a potential HARQ-ACK transmission in an OFDM symbol l, for $l=0, 1, 2, \ldots, N^{PUSCH}_{symball}-1$, in the PUSCH transmission, e.g. defined in Subclause 6.2.7 of 3GPP TS 38.212 V15.3.0;

$M^{UCI}_{sc}(l)$ is a number of resource elements that can be used for transmission of UCI in an OFDM symbol l, for $l=0, 1, 2, \ldots, N^{PUSCH}_{symball}-1$, in the UL transmission on the PUSCH and $M^{PUSCH}_{symball}$ is a total number of OFDM symbols of the PUSCH, including all OFDM symbols used for DMRS;

for any OFDM symbol that carries DMRS of the PUSCH, $M^{UCI}_{sc}(l)=0$;

for any OFDM symbol that does not carry DMRS of the PUSCH, $M^{UCI}_{sc}(l) = M^{PUSCH}_{sc} - M^{PT-RS}_{sc}(l)$;

α is configured by higher layer parameter scaling;

$Q_m$ is a modulation rate of the PUSCH; and

R is a coding rate of the PUSCH.

Again, the parameters may be replaced with parameters that are stated in term of configured grant UCI, for purposes of this disclosure. For example, $Q'_{CSI-1}$ may be replaced with $Q'_{CG-UCI}$, $O_{CSI}$ may be replaced with $O_{CG-UCI}$, and so on.

In a particular embodiment, a number of PUSCH symbols is assumed to be fixed and does not correspond to an actual length of the PUSCH for the UCI.

In a particular embodiment, the one or more parameters comprise a UCI coded symbol length that is derived using an equation:

$$Q'_{CSI-1} = \min \left\{ \left\lceil \frac{(O_{CSI-1} + L_{CSI-1}) \cdot \beta^{PUSCH}_{offset}}{R \cdot Q_m} \right\rceil, \sum_{l=0}^{N^{PUSCH}_{symb,all}-1} M^{UCI}_{sc}(l) - Q'_{ACK} \right\}, \quad (1)$$

wherein:

$O_{CSI-1}$ represents a number of bits for a configured grant UCI;

if $O_{CSI-1} \geq 360$, $L_{CSI-1}=11$; otherwise $L_{CSI-1}$ is a number of CRC bits for CSI part 1, e.g. determined according to Subclause 6.3.1.2.1 of 3GPP TS 38.212V15.3.0;

$\beta^{PUSCH}_{offset} = \beta^{CSI-part1}_{offset}$;

$Q'_{ACK}$ is a number of coded modulation symbols per layer for HARQ-ACK transmitted on the PUSCH if a number of HARQ-ACK information bits is more than 2, and $$Q'_{ACK} = \sum_{l=0}^{N^{PUSCH}_{symb,all}-1} \overline{M}^{ACK}_{sc,rvd}(l) \quad (1)$$

if the number of HARQ-ACK information bits is no more than 2 bits, where $\overline{M}^{ACK}_{sc,rvd}(l)$ is the number of reserved resource elements for a potential HARQ-ACK transmission in an OFDM symbol l, for $l=0, 1, 2, \ldots, N^{PUSCH}_{symball}-1$, in the PUSCH transmission, e.g. defined in Subclause 6.2.7 of 3GPP TS 38.212 V15.3.0;

$M^{UCI}_{sc}(l)$ is a number of resource elements that can be used for transmission of UCI in an OFDM symbol l, for $l=0, 1, 2, \ldots, N^{PUSCH}_{symball}-1$, in the UL transmission on the PUSCH and $N^{PUSCH}_{symball}$ is a total number of OFDM symbols of the PUSCH, including all OFDM symbols used for DMRS;

for any OFDM symbol that carries DMRS of the PUSCH, $M^{UCI}_{sc}(l)=0$;

for any OFDM symbol that does not carry DMRS of the PUSCH, $M^{UCI}_{sc}(l) = M^{PUSCH}_{sc} - M^{PT-RS}_{sc}(l)$;

α is configured by higher layer parameter scaling;

$Q_m$ is a modulation rate of the PUSCH; and
R is a coding rate of the PUSCH.

Again, the parameters may be replaced with parameters that are stated in term of configured grant UCI, for purposes of this disclosure. For example, $Q'_{CSI-1}$ may be replaced with $Q'_{CG-UCI}$, $O_{CSI}$ may be replaced with $O_{CG-UCI}$, and so on.

In a particular embodiment, a length of the PUSCH is assumed to be fixed.

In a particular embodiment, the method further includes receiving a signal indicating an assumed starting symbol of the PUSCH for generating UCI coded symbols.

In a particular embodiment, the one or more parameters comprises a UCI coded symbol length that is derived using an equation:

$$Q'_{CSI} = \left\lceil \frac{(O_{CSI} + L_{CSI}) \cdot \beta_{offset}^{PUSCH}}{R \cdot Q_m} \right\rceil$$

wherein:
$O_{CSI}$ is a number of bits for a configured grant UCI;
if $O_{CSI-1} \geq 360$, $L_{CSI-1}=11$; otherwise $L_{CSI-1}$ is the number of CRC bits for CSI part 1, e.g. determined according to Subclause 6.3.1.2.1 of 3GPP TS 38.212 V15.3.0;
$\beta_{offset}^{PUSCH} = \beta_{offset}^{CSI-part1}$;
$Q_m$ is a modulation rate of the PUSCH; and
R is to coding rate of the PUSCH.

Again, the parameters may be replaced with parameters that are stated in term of configured grant UCI, for purposes of this disclosure. For example, $Q'_{CSI-1}$ may be replaced with $Q'_{CG-UCI}$, $O_{CSI}$ may be replaced with $O_{CG-UCI}$, and so on.

In a particular embodiment, the method includes dropping one or more UCI coded symbols.

Figure 19:
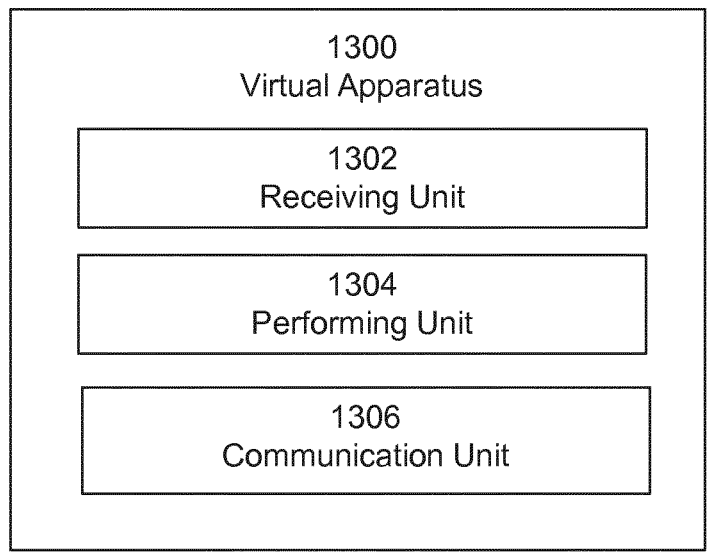
FIG. 19 illustrates another exemplary virtual computing device, according to certain embodiments.

FIG. 19 illustrates a schematic block diagram of a virtual apparatus 1300 in a wireless network (for example, the wireless network shown in FIG. 5). The apparatus may be implemented in a wireless device (e.g., wireless device 110 shown in FIG. 5). Apparatus 1300 is operable to carry out the example method described with reference to FIG. 18 and possibly any other processes or methods disclosed herein. It is also to be understood that the method of FIG. 18 is not necessarily carried out solely by apparatus 1300. At least some operations of the method can be performed by one or more other entities.

Virtual Apparatus 1300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1302, performing unit 1304, communication unit 1306, and any other suitable units of apparatus 1300 to perform corresponding functions according one or more embodiments of the present disclosure.

In certain embodiments, apparatus 1300 may be a UE. As illustrated in FIG. 19, apparatus 1300 includes receiving unit 1302, performing unit 1304, and communication unit 1306.

Receiving unit 1302 may be configured to perform the receiving functions of apparatus 1300. For example, receiving unit 1302 may be configured to receive a configuration for one or more data transmission starting positions for a configured UL in unlicensed spectrum. The one or more data transmission starting positions include at least a first starting position.

Receiving unit 1302 may receive any suitable information (e.g., from a wireless device or another network node). Receiving unit 1302 may include a receiver and/or a transceiver, such as RF transceiver circuitry 122 described above in relation to FIG. 7. Receiving unit 1302 may include circuitry configured to receive messages and/or signals (wireless or wired). In particular embodiments, receiving unit 1302 may communicate received messages and/or signals to determining unit 1304 and/or any other suitable unit of apparatus 1300. The functions of receiving unit 1302 may, in certain embodiments, be performed in one or more distinct units.

Performing unit 1304 may perform the performing functions of apparatus 1100. For example, performing unit 1304 may be configured to perform an UL transmission at one of the one or more data transmission starting positions based on when the wireless device is able to access a channel. The UL transmission includes UCI multiplexed in a PUSCH. The UCI carries one or more parameters for unlicensed spectrum.

Performing unit 1304 may include or be included in one or more processors, such as processing circuitry 120 described above in relation to FIG. 7. Performing unit 1304 may include analog and/or digital circuitry configured to perform any of the functions of performing unit 1304 and/or processing circuitry 120 described above. The functions of performing unit 1104 may, in certain embodiments, be performed in one or more distinct units.

Communication unit 1106 may be configured to perform the transmission functions of apparatus 1100. For example, communication unit 1106 may be configured to perform an UL transmission at one of the one or more data transmission starting positions.

Communication unit 1306 may transmit messages (e.g., to a wireless device and/or another network node). Communication unit 1306 may include a transmitter and/or a transceiver, such as RF transceiver circuitry 122 described above in relation to FIG. 7. Communication unit 1306 may include circuitry configured to transmit messages and/or signals (e.g., through wireless or wired means). In particular embodiments, communication unit 1306 may receive messages and/or signals for transmission from determining unit 1304 or any other unit of apparatus 1300. The functions of communication unit 1304 may, in certain embodiments, be performed in one or more distinct units.

Figure 20:
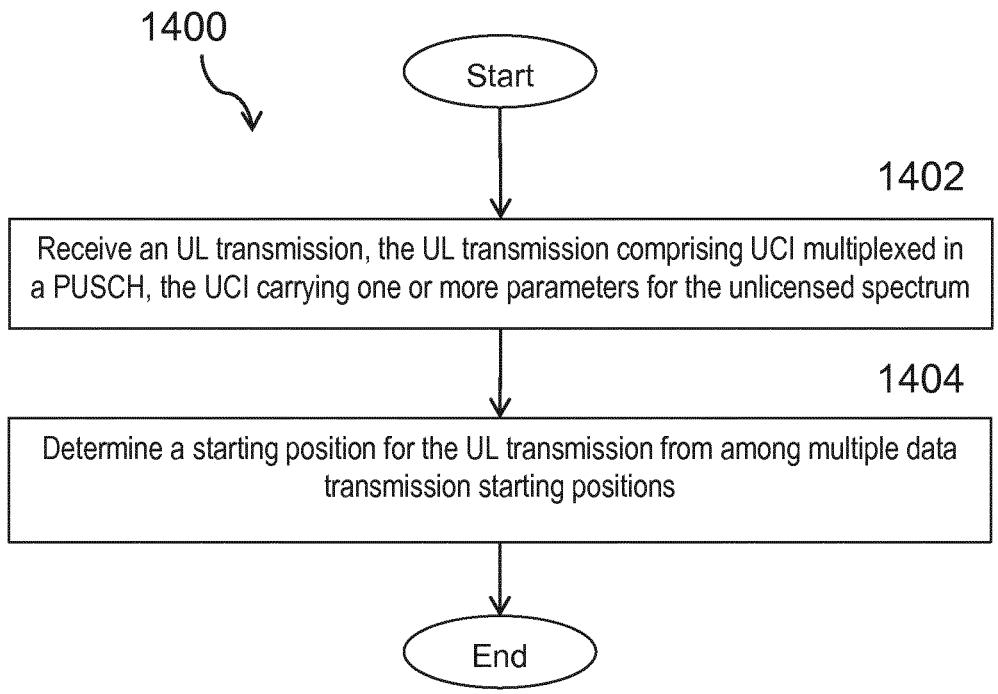
FIG. 20 illustrates an example method by a network node, according to certain embodiments.

FIG. 20 depicts a method 1400 in a network node, in accordance with particular embodiments. The method begins at step 1402, where the network node receives an UL transmission, the UL transmission comprising UCI multiplexed in a PUSCH, the UCI carrying one or more parameters for unlicensed spectrum.

In certain embodiments, the UL transmission may start with a DMRS symbol. In certain embodiments, UCI mapping may start from an immediate next symbol in the UL transmission after the DMRS symbol.

In certain embodiments, the method may comprise transmitting a signal indicating an assumed starting symbol of the PUSCH for generating UCI coded symbols.

In certain embodiments, the UL transmission may comprise one or more UCI coded symbols. In certain embodiments, a number of UCI coded symbols may be calculated independent of an actual length of the PUSCH. In certain embodiments, a number of UCI coded symbols may be calculated assuming a PUSCH length equivalent to a duration from a starting position of the UL transmission to an end of a slot.

At step 1404, the network node determines a starting position for the UL transmission from among one or more data transmission starting positions.

In certain embodiments, the starting position for the UL transmission may be determined based on a number of UCI bits. In certain embodiments, the method may comprise using the number of UCI bits as a reference for a starting symbol of the UL transmission.

In certain embodiments, UCI coded symbol length may be derived using the equation:

$$Q'_{CSI-1} = \min\left\{ \left\lceil \frac{(O_{CSI-1} + L_{CSI-1}) \cdot \beta^{PUSCH}_{offset} \cdot \sum_{l=0}^{N^{PUSCH}_{symb,all}-1} M^{UCI}_{sc}(l)}{\sum_{r=0}^{C_{UL-SCH}-1} K_r} \right\rceil, \right.$$

$$\left. \left\lceil \alpha \cdot \sum_{l=0}^{N^{PUSCH}_{symb,all}-1} M^{UCI}_{sc}(l) \right\rceil - Q'_{ACK} \right\}$$

Again, the parameters may be replaced with parameters that are stated in term of configured grant UCI, for purposes of this disclosure. For example, $Q'_{CSI-1}$ may be replaced with $Q'_{CG-UCI}$, $O_{CSI}$ may be replaced with $O_{CG-UCI}$, and so on.

In certain embodiments, a number of PUSCH symbols may be assumed to be fixed and may not correspond to an actual length of the PUSCH for which the UCI corresponds.

In certain embodiments, UCI coded symbol length may be derived using the equation:

$$Q'_{CSI-1} = \min\left\{ \left\lceil \frac{(O_{CSI-1} + L_{CSI-1}) \cdot \beta^{PUSCH}_{offset}}{R \cdot Q_m} \right\rceil, \sum_{l=0}^{N^{PUSCH}_{sym,ball}-1} M^{UCI}_{sc}(l) - Q'_{ACK} \right\},$$

wherein $Q_m$ and R are a modulation and a coding rate of the PUSCH. In certain embodiments, a length of the PUSCH may be assumed to be fixed. Again, the parameters may be replaced with parameters that are stated in term of configured grant UCI, for purposes of this disclosure. For example, $Q'_{CSI-1}$ may be replaced with $Q'_{CG-UCI}$, $O_{CSI}$ may be replaced with $O_{CG-UCI}$, and so on.

In certain embodiments, UCI coded symbol length may be derived using the equation:

$$Q'_{CSI} = \left\lceil \frac{(O_{CSI} + L_{CSI}) \cdot \beta^{PUSCH}_{offset}}{R \cdot Q_m} \right\rceil$$

Again, the parameters may be replace with parameters that are stated in term of configured grant UCI, for purposes of this disclosure. For example, $Q'_{CSI-1}$ may be replaced with $Q'_{CG-UCI}$, $O_{CSI}$ may be replaced with $O_{CG-UCI}$, and so on.

Figure 21:
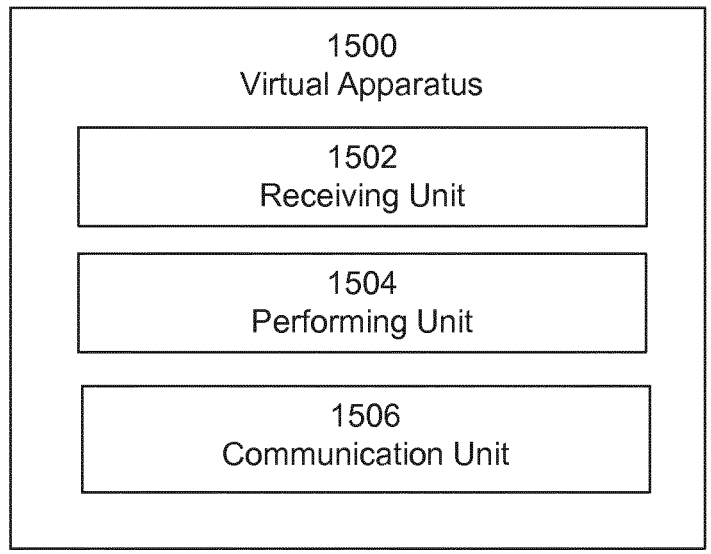
FIG. 21 illustrates another exemplary virtual computing device, according to certain embodiments.

FIG. 21 illustrates a schematic block diagram of a virtual apparatus 1500 in a wireless network (for example, the wireless network shown in FIG. 5). The apparatus may be implemented in a network node (e.g., network node 160 shown in FIG. 5). Apparatus 1500 is operable to carry out the example method described with reference to FIG. 20 and possibly any other processes or methods disclosed herein. It is also to be understood that the method of FIG. 20 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1502, determining unit 1504, communication unit 1506, and any other suitable units of apparatus 1500 to perform corresponding functions according one or more embodiments of the present disclosure.

In certain embodiments, apparatus 1500 may be an eNB or a gNB. As illustrated in FIG. 21, apparatus 1500 includes receiving unit 1502, determining unit 1504, and communication unit 1506. Receiving unit 1502 may be configured to perform the receiving functions of apparatus 1500. For example, receiving unit 1502 may be configured to receive an UL transmission, the UL transmission comprising UCI multiplexed in a PUSCH, the UCI carrying one or more parameters for unlicensed spectrum.

Receiving unit 1502 may receive any suitable information (e.g., from a wireless device or another network node). Receiving unit 1502 may include a receiver and/or a transceiver, such as RF transceiver circuitry 172 described above in relation to FIG. 1. Receiving unit 1502 may include circuitry configured to receive messages and/or signals (wireless or wired). In particular embodiments, receiving unit 1502 may communicate received messages and/or signals to determining unit 1504 and/or any other suitable unit of apparatus 1500. The functions of receiving unit 1502 may, in certain embodiments, be performed in one or more distinct units.

Determining unit 1504 may perform the processing functions of apparatus 1500. For example, determining unit 1504 may be configured to determine a starting position for the UL transmission from among one or more data transmission starting positions. In certain embodiments, determining unit 1504 may be configured to determine the starting position for the UL transmission based on a number of UCI bits. In certain embodiments, determining unit 1504 may be configured to use the number of UCI bits as a reference for a starting symbol of the UL transmission. As another example, determining unit 1504 may be configured to derive UCI coded symbol length.

Determining unit 1504 may include or be included in one or more processors, such as processing circuitry 170 described above in relation to FIG. 1. Determining unit 1504 may include analog and/or digital circuitry configured to perform any of the functions of determining unit 1504 and/or processing circuitry 170 described above. The functions of determining unit 1504 may, in certain embodiments, be performed in one or more distinct units.

Communication unit 1506 may be configured to perform the transmission functions of apparatus 1500. For example, communication unit 1506 may be configured to transmit a signal indicating an assumed starting symbol of the PUSCH for generating UCI coded symbols.

Communication unit 1506 may transmit messages (e.g., to a wireless device and/or another network node). Communication unit 1506 may include a transmitter and/or a transceiver, such as RF transceiver circuitry 172 described above in relation to FIG. 1. Communication unit 1506 may include circuitry configured to transmit messages and/or signals (e.g., through wireless or wired means). In particular embodiments, communication unit 1506 may receive messages and/or signals for transmission from determining unit 1504 or any other unit of apparatus 1500. The functions of communication unit 1504 may, in certain embodiments, be performed in one or more distinct units.

Figure 22:
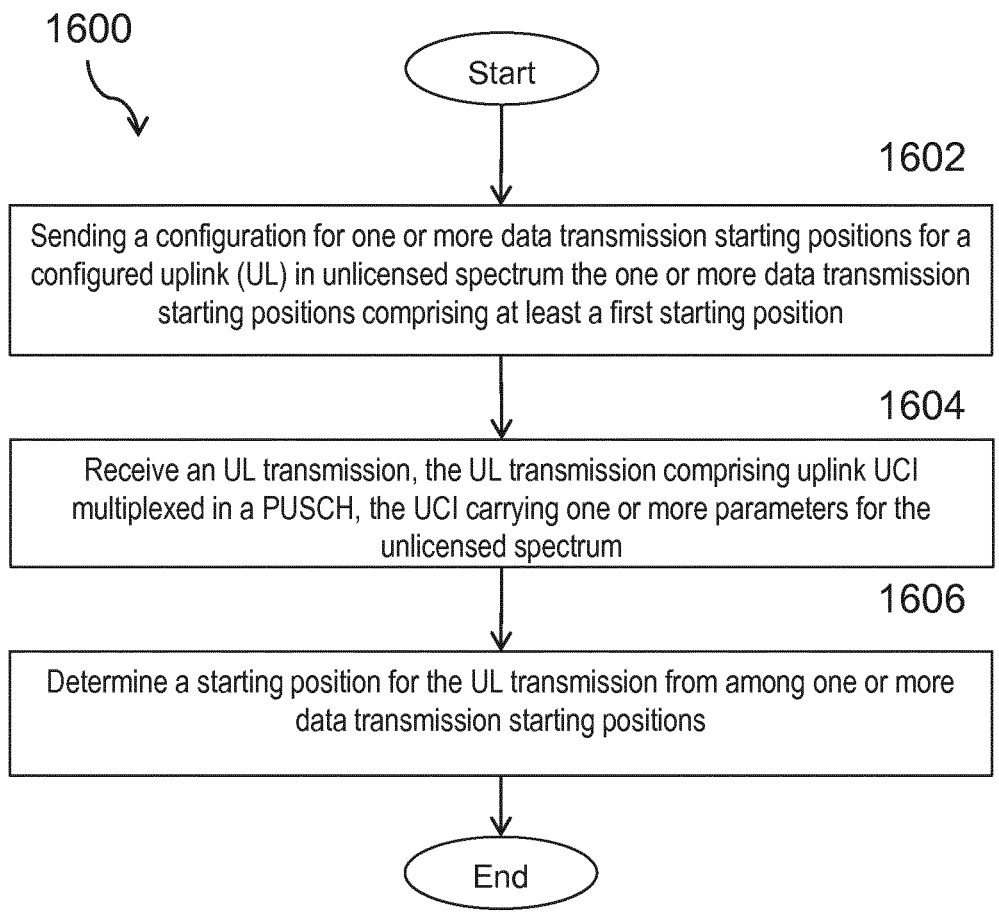
FIG. 22 illustrates another example method by a network node, according to certain embodiments.

FIG. 22 depicts another method 1600 in a network node 160, in accordance with particular embodiments. The method begins at step 1602, where the network node sends a configuration for one or more data transmission starting positions for a configured UL in unlicensed spectrum. The one or more data transmission starting positions include at least a first starting position. At step 1604, an UL transmission is received. The UL transmission includes UCI multiplexed in a PUSCH. The UCI carries one or more parameters for the unlicensed spectrum. At step 1606, a starting position is determined for the UL transmission from among the one or more data transmission starting positions.

In a particular embodiment, the starting position for the UL transmission is determined based on a number of UCI bits.

In a particular embodiment, the method includes using the number of UCI bits as a reference for a starting symbol of the UL transmission.

In a particular embodiment, the UL transmission starts with a demodulation reference signal symbol.

In a particular embodiment, a UCI mapping starts from an immediate next symbol in the UL transmission after a demodulation reference signal symbol.

In a particular embodiment, a number of UCI coded symbols is calculated independent of an actual length of the PUSCH.

In a particular embodiment, a number of UCI coded symbols is calculated assuming a PUSCH length equivalent to a duration from a starting position of the UL transmission to an end of a slot.

In a particular embodiment, the one or more parameters comprise a UCI coded symbol length that is derived using an equation:

$$Q'_{CSI-1} = \min\left\{ \left\lceil \frac{(O_{CSI-1} + L_{CSI-1}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \right.$$

$$\left. \left\lceil \alpha \cdot \sum_{l=0}^{N_{symb,all}^{PUSCH}-1} M_{sc}^{UCI}(l) \right\rceil - Q'_{ACK} \right\}$$

wherein:
- $O_{CSI-1}$ represents a number of bits for a configured grant UCI;
- $O_{CSI}$ is a number of bits for a configured grant UCI;
- if $O_{CSI-1} \geq 360$, $L_{CSI-1}=11$; otherwise $L_{CSI-1}$ is a number of CRC bits for CSI part 1, e.g. determined according to Subclause 6.3.1.2.1 of 3GPP TS 38.212 V15.3.0;
- $\beta_{offset}^{PUSCH} = \beta_{offset}^{CSI-part1}$;
- $C_{UL-SCH}$ is a number of code blocks for an uplink shared channel (UL-SCH) of the UL transmission on the PUSCH;
- if a downlink control information (DCI) format scheduling the UL transmission on the PUSCH includes a CBGTI field indicating that the wireless device shall not transmit the r-th code block, $K_r=0$; otherwise, $K_r$ is the r-th code block size for the UL-SCH of the transmission on the PUSCH;
- $Q'_{ACK}$ is a number of coded modulation symbols per layer for HARQ-ACK transmitted on the PUSCH if a number of HARQ-ACK information bits is more than 2, and $$Q'_{ACK} = \sum_{l=0}^{N_{symb,all}^{PUSCH}-1} \bar{M}_{sc,rvd}^{ACK}(l)$$

if the number of HARQ-ACK information bits is no more than 2 bits, where $\bar{M}_{sc,rvd}^{ACK}(l)$ is the number of reserved resource elements for a potential HARQ-ACK transmission in an OFDM symbol l, for l=0, 1, 2, ..., $N_{symball}^{PUSCH}-1$, in the PUSCH transmission, e.g. defined in Subclause 6.2.7 of 3GPP TS 38.212 V15.3.0;
- $M_{sc}^{UCI}(l)$ is a number of resource elements that can be used for transmission of UCI in an OFDM symbol l, for l=0, 1, 2, ..., $N_{symball}^{PUSCH}-1$, in the UL transmission on the PUSCH and $N_{symball}^{PUSCH}$ is a total number of OFDM symbols of the PUSCH, including all OFDM symbols used for DMRS;
- for any OFDM symbol that carries DMRS of the PUSCH, $M_{sc}^{UCI}(l)=0$;
- for any OFDM symbol that does not carry DMRS of the PUSCH, $M_{sc}^{UCI}(l)=M_{sc}^{PUSCH}-M_{sc}^{PT-RS}(l)$;
- $\alpha$ is configured by higher layer parameter scaling;
- $Q_m$ is a modulation rate of the PUSCH; and
- R is a coding rate of the PUSCH.

Again, the parameters may be replaced with parameters that are stated in term of configured grant UCI, for purposes of this disclosure. For example, $Q'_{CSI-1}$ may be replaced with $Q'_{CG-CI}$, $O_{CSI}$ may be replaced with $O_{CG-UCI}$, and so on.

In a particular embodiment, a number of PUSCH symbols is assumed to be fixed and does not correspond to an actual length of the PUSCH for the UCI.

In a particular embodiment, the one or more parameters comprise a UCI coded symbol length that is derived using the equation:

$$Q'_{CSI-1} = \min\left\{\left\lceil \frac{(O_{CSI-1} + L_{CSI-1}) \cdot \beta_{offset}^{PUSCH}}{R \cdot Q_m} \right\rceil, \sum_{l=0}^{N_{symb,all}^{PUSCH}-1} M_{sc}^{UCI}(l) - Q'_{ACK}\right\},$$

wherein:

$O_{CSI-1}$ represents a number of bits for a configured grant UCI;

if $O_{CSI-1} \geq 360$, $L_{CSI-1}=11$; otherwise $L_{CSI-1}$ is a number of CRC bits for CSI part 1, e.g. determined according to Subclause 6.3.1.2.1 of 3GPP TS 38.212 V15.3.0;

$\beta_{offset}^{PUSCH} = \beta_{offset}^{CSI-part1}$;

$Q'_{ACK}$ is a number of coded modulation symbols per layer for HARQ-ACK transmitted on the PUSCH if a number of HARQ-ACK information bits is more than 2, and $$Q'_{ACK} = \sum_{l=0}^{N_{symb,all}^{PUSCH}-1} \overline{M}_{sc,rvd}^{ACK}(l)$$

if the number of HARQ-ACK information bits is no more than 2 bits, where $\overline{M}_{sc,rvd}^{ACK}(l)$ is the number of reserved resource elements for a potential HARQ-ACK transmission in an OFDM symbol l, for $l=0, 1, 2, \ldots, N_{symball}^{PUSCH}-1$ in the PUSCH transmission, e.g. defined in Subclause 6.2.7 of 3GPP TS 38.212 V15.3.0;

$M_{sc}^{UCI}(l)$ is a number of resource elements that can be used for transmission of UCI in an OFDM symbol l, for $l=0, 1, 2, \ldots, N_{symball}^{PUSCH}-1$, in the UL transmission on the PUSCH and $N_{symball}^{PUSCH}$ is a total number of OFDM symbols of the PUSCH, including all OFDM symbols used for DMRS;

for any OFDM symbol that carries DMRS of the PUSCH, $M_{sc}^{UCI}(l)=0$;

for any OFDM symbol that does not carry DMRS of the PUSCH, $M_{sc}^{UCI}(l)=M_{sc}^{PUSCH}-M_{sc}^{PT-RS}(l)$;

α is configured by higher layer parameter scaling;

$Q_m$ is a modulation rate of the PUSCH; and

R is a coding rate of the PUSCH.24.

Again, the parameters may be replaced with parameters that are stated in term of configured grant UCI, for purposes of this disclosure. For example, $Q'_{CSI-1}$ may be replaced with $Q'_{CG-UCI}$, $O_{CSI}$ may be replaced with $O_{CG-UCI}$, and so on.

In a particular embodiment, a length of the PUSCH is assumed to be fixed.

In a particular embodiment, the method further includes transmitting a signal indicating an assumed starting symbol of the PUSCH for generating UCI coded symbols.

In a particular embodiment, the one or more parameters comprise a UCI coded symbol length that is derived using the equation:

$$Q'_{CSI} = \left\lceil \frac{(O_{CSI} + L_{CSI}) \cdot \beta_{offset}^{PUSCH}}{R \cdot Q_m} \right\rceil$$

wherein:

$O_{CSI}$ is a number of bits for a configured grant UCI;

if $O_{CSI-1} \geq 360$, $L_{CSI-1}=11$; otherwise $L_{CSI-1}$ is the number of CRC bits for CSI part 1, e.g. determined according to Subclause 6.3.1.2.1 of 3GPP TS 38.212 V15.3.0;

$\beta_{offset}^{PUSCH} = \beta_{offset}^{CSI-part1}$;

$Q_m$ is a modulation rate of the PUSCH; and

R is a coding rate of the PUSCH.

Again, the parameters may be replaced with parameters that are stated in term of configured grant UCI, for purposes of this disclosure. For example, $Q'_{CSI-1}$ may be replaced with $Q'_{CG-UCI}$, $O_{CSI}$ may be replaced with $O_{CG-UCI}$, and so on.

Figure 23:
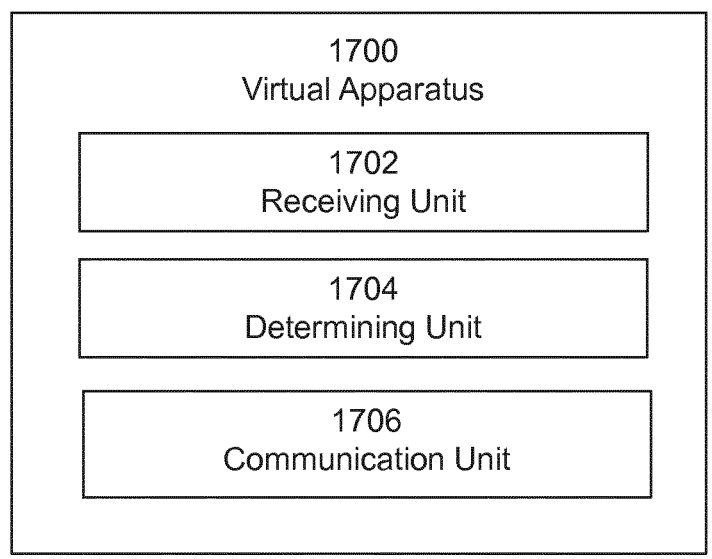
FIG. 23 illustrates another exemplary virtual computing device, according to certain embodiments.

FIG. 23 illustrates a schematic block diagram of an apparatus 1700 in a wireless network (for example, the wireless network shown in FIG. 5). The apparatus may be implemented in a network node (e.g., network node 160 shown in FIG. 5). Apparatus 1700 is operable to carry out the example method described with reference to FIG. 22 and possibly any other processes or methods disclosed herein. It is also to be understood that the method of FIG. 22 is not necessarily carried out solely by apparatus 1700. At least some operations of the method can be performed by one or more other entities.

Virtual Apparatus 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1702, determining unit 1704, communication unit 1706, and any other suitable units of apparatus 1700 to perform corresponding functions according one or more embodiments of the present disclosure.

In certain embodiments, apparatus 1700 may be an eNB or a gNB. As illustrated in FIG. 23, apparatus 1700 includes receiving unit 1702, determining unit 1704, and communication unit 1706. Receiving unit 1702 may be configured to perform the receiving functions of apparatus 1700. For example, receiving unit 1702 may be configured to receive an UL transmission. The UL transmission includes UCI multiplexed in a PUSCH. The UCI carries one or more parameters for the unlicensed spectrum.

Receiving unit 1702 may receive any suitable information (e.g., from a wireless device or another network node). Receiving unit 1702 may include a receiver and/or a transceiver, such as RF transceiver circuitry 172 described above in relation to FIG. 6. Receiving unit 1702 may include circuitry configured to receive messages and/or signals (wireless or wired). In particular embodiments, receiving unit 1702 may communicate received messages and/or signals to determining unit 1704 and/or any other suitable unit of apparatus 1700. The functions of receiving unit 1702 may, in certain embodiments, be performed in one or more distinct units.

Determining unit 1704 may perform the processing functions of apparatus 1700. For example, determining unit 1704 may be configured to determine a starting position for the UL transmission from among the one or more data transmission starting positions.

Determining unit 1704 may include or be included in one or more processors, such as processing circuitry 170 described above in relation to FIG. 6. Determining unit 1704 may include analog and/or digital circuitry configured to perform any of the functions of determining unit 1704 and/or processing circuitry 170 described above. The functions of determining unit 1704 may, in certain embodiments, be performed in one or more distinct units.

Communication unit 1706 may be configured to perform the transmission functions of apparatus 1700. For example, communication unit 1706 may be configured to transmit a signal indicating an assumed starting symbol of the PUSCH for generating UCI coded symbols.

Communication unit 1706 may transmit messages (e.g., to a wireless device and/or another network node). Communication unit 1706 may include a transmitter and/or a transceiver, such as RF transceiver circuitry 172 described above in relation to FIG. 6. Communication unit 1706 may include circuitry configured to transmit messages and/or signals (e.g., through wireless or wired means). In particular embodiments, communication unit 1706 may receive messages and/or signals for transmission from determining unit 1704 or any other unit of apparatus 1700. The functions of communication unit 1704 may, in certain embodiments, be performed in one or more distinct units.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

EXAMPLES

Group A Examples

1. A method performed by a wireless device, the method comprising:
    receiving a configuration for multiple data transmission starting positions for a configured uplink (UL) in unlicensed spectrum, the multiple data transmission starting positions comprising at least a first starting position; and
    performing an UL transmission at one of the multiple data transmission starting positions based on when the wireless device is able to access a channel, the UL transmission comprising UL control information (UCI) multiplexed in a Physical Uplink Shared Channel (PUSCH), the UCI carrying one or more parameters for unlicensed spectrum.

2. The method of example 1, comprising preparing the UL transmission assuming that resources are available from the first starting position until the end of a slot.

3. The method of any of examples 1-2, further comprising:
    performing a listen-before-talk (LBT) procedure in connection with an attempt to access the channel; and
    determining that the wireless device cannot access the channel at the first starting position based on an outcome of the LBT procedure.

4. The method of example 3, further comprising:
    in response to determining that the wireless device cannot access the channel at the first starting position, adapting a transport block size (TBS) of the UL transmission into a different amount of radio resources to accommodate a second starting position of the multiple data transmission starting positions.

5. The method of example 3, further comprising:
    in response to determining that the wireless device cannot access the channel at the first starting position, puncturing a processed transport block (TB) on available resource elements.

6. The method of any of examples 1-5, wherein the UL transmission starts with a demodulation reference signal symbol.

7. The method of example 6, wherein UCI mapping starts from an immediate next symbol in the UL transmission after the demodulation reference signal symbol.

8. The method of any of examples 1-7, further comprising generating one or more UCI coded symbols.

9. The method of example 1-8, wherein a number of UCI coded symbols is calculated independent of an actual length of the PUSCH.

10. The method of any of examples 1-9, wherein a number of UCI coded symbols is calculated assuming a PUSCH length equivalent to a duration from a starting position of the UL transmission to an end of a slot.

11. The method of any of examples 1-10, wherein UCI coded symbol length is derived using the equation:

$$Q'_{CSI-1} = \min\left\{ \left\lceil \frac{(O_{CSI-1} + L_{CSI-1}) \cdot \beta^{PUSCH}_{offset} \cdot \sum_{l=0}^{N^{PUSCH}_{symb,all}-1} M^{UCI}_{sc}(l)}{\sum_{r=0}^{C_{UL-SCH}-1} K_r} \right\rceil, \left\lceil \alpha \cdot \sum_{l=0}^{N^{PUSCH}_{symb,all}-1} M^{UCI}_{sc}(l) \right\rceil - Q'_{ACK} \right\}$$

12. The method of example 11, wherein a number of PUSCH symbols is assumed to be fixed and does not correspond to an actual length of the PUSCH for which the UCI corresponds.

13. The method of any of examples 1-10, wherein UCI coded symbol length is derived using the equation:

$$Q'_{CSI-1} = \min\left\{\left\lceil\frac{(O_{CSI-1} + L_{CSI-1}) \cdot \beta^{PUSCH}_{offset}}{R \cdot Q_m}\right\rceil, \sum_{l=0}^{N^{PUSCH}_{symb,all}-1} M^{UCI}_{sc}(l) - Q'_{ACK}\right\}$$

wherein $Q_m$ and R are a modulation and a coding rate of the PUSCH.

14. The method of example 13, wherein a length of the PUSCH is assumed to be fixed.

15. The method of any of examples 1-14, further comprising receiving a signal indicating an assumed starting symbol of the PUSCH for generating UCI coded symbols.

16. The method of any of examples 1-10, wherein UCI coded symbol length is derived using the equation:

$$Q'_{CSI} = \left\lceil\frac{(O_{CSI} + L_{CSI}) \cdot \beta^{PUSCH}_{offset}}{R \cdot Q_m}\right\rceil$$

17. The method of example 16, further comprising dropping one or more UCI coded symbols.

Group B Examples

18. A method performed by a network node, the method comprising:
   receiving an UL transmission, the UL transmission comprising UL control information (UCI) multiplexed in a Physical Uplink Shared Channel (PUSCH), the UCI carrying one or more parameters for unlicensed spectrum; and
   determining a starting position for the UL transmission from among multiple data transmission starting positions.

19. The method of example 18, wherein the starting position for the UL transmission is determined based on a number of UCI bits.

20. The method of example 19, comprising using the number of UCI bits as a reference for a starting symbol of the UL transmission.

21. The method of any of examples 18-20, wherein the UL transmission starts with a demodulation reference signal symbol.

22. The method of example 21, wherein UCI mapping starts from an immediate next symbol in the UL transmission after the demodulation reference signal symbol.

23. The method of any of examples 18-22, wherein the UL transmission comprises one or more UCI coded symbols.

24. The method of any of examples 18-23, wherein a number of UCI coded symbols is calculated independent of an actual length of the PUSCH.

25. The method of any of examples 18-24, wherein a number of UCI coded symbols is calculated assuming a PUSCH length equivalent to a duration from a starting position of the UL transmission to an end of a slot.

26. The method of any of examples 18-25, wherein UCI coded symbol length is derived using the equation:

$$Q'_{CSI-1} = \min\left\{\left\lceil\frac{(O_{CSI-1} + L_{CSI-1}) \cdot \beta^{PUSCH}_{offset} \cdot \sum_{l=0}^{N^{PUSCH}_{symb,all}-1} M^{UCI}_{sc}(l)}{\sum_{r=0}^{C_{UL-SCH}-1} K_r}\right\rceil,\right.$$
$$\left.\left\lceil\alpha \cdot \sum_{l=0}^{N^{PUSCH}_{symb,all}-1} M^{UCI}_{sc}(l)\right\rceil - Q'_{ACK}\right\}$$

27. The method of example 26, wherein a number of PUSCH symbols is assumed to be fixed and does not correspond to an actual length of the PUSCH for which the UCI corresponds.

28. The method of any of examples 18-25, wherein UCI coded symbol length is derived using the equation:

$$Q'_{CSI-1} = \min\left\{\left\lceil\frac{(O_{CSI-1} + L_{CSI-1}) \cdot \beta^{PUSCH}_{offset}}{R \cdot Q_m}\right\rceil, \sum_{l=0}^{N^{PUSCH}_{symb,all}-1} M^{UCI}_{sc}(l) - Q'_{ACK}\right\},$$

wherein $Q_m$ and R are a modulation and a coding rate of the PUSCH.

29. The method of example 28, wherein a length of the PUSCH is assumed to be fixed.

30. The method of any of examples 18-29, further comprising transmitting a signal indicating an assumed starting symbol of the PUSCH for generating UCI coded symbols.

31. The method of any of examples 18-25, wherein UCI coded symbol length is derived using the equation:

$$Q'_{CSI} = \left\lceil\frac{(O_{CSI} + L_{CSI}) \cdot \beta^{PUSCH}_{offset}}{R \cdot Q_m}\right\rceil$$

Group C Examples

32. A wireless device configured to:
   receive a configuration for multiple data transmission starting positions for a configured uplink (UL) in unlicensed spectrum, the multiple data transmission starting positions comprising at least a first starting position; and
   perform an UL transmission at one of the multiple data transmission starting positions based on when the wireless device is able to access a channel, the UL transmission comprising UL control information (UCI) multiplexed in a Physical Uplink Shared Channel (PUSCH), the UCI carrying one or more parameters for unlicensed spectrum.

33. The wireless device of example 32, further configured to prepare the UL transmission assuming that resources are available from the first starting position until the end of a slot.

34. The wireless device of any of examples 32-33, further configured to:
   perform a listen-before-talk (LBT) procedure in connection with an attempt to access the channel; and
   determine that the wireless device cannot access the channel at the first starting position based on an outcome of the LBT procedure.

35. The wireless device of example 34, further configured to:
   in response to determining that the wireless device cannot access the channel at the first starting position, adapt a transport block size (TBS) of the UL transmission into a different amount of radio resources to accommodate a second starting position of the multiple data transmission starting positions.

36. The wireless device of example 34, further configured to:
   in response to determining that the wireless device cannot access the channel at the first starting position, puncture a processed transport block (TB) on available resource elements.

37. The wireless device of any of examples 32-36, wherein the UL transmission starts with a demodulation reference signal symbol.

38. The wireless device of example 37, wherein UCI mapping starts from an immediate next symbol in the UL transmission after the demodulation reference signal symbol.

39. The wireless device of any of examples 32-38, further configured to generate one or more UCI coded symbols.

40. The wireless device of example 32-39, wherein a number of UCI coded symbols is calculated independent of an actual length of the PUSCH.

41. The wireless device of any of examples 32-40, wherein a number of UCI coded symbols is calculated assuming a PUSCH length equivalent to a duration from a starting position of the UL transmission to an end of a slot.

42. The wireless device of any of examples 32-41, wherein UCI coded symbol length is derived using the equation:

$$Q'_{CSI-1} = \min\left\{\left\lceil\frac{(O_{CSI-1} + L_{CSI-1}) \cdot \beta^{PUSCH}_{offset} \cdot \sum_{l=0}^{N^{PUSCH}_{symb,all}-1} M^{UCI}_{sc}(l)}{\sum_{r=0}^{C_{UL-SCH}-1} K_r}\right\rceil,\right.$$

$$\left.\left\lceil \alpha \cdot \sum_{l=0}^{N^{PUSCH}_{symb,all}-1} M^{UCI}_{sc}(l) \right\rceil - Q'_{ACK} \right\}$$

43. The wireless device of example 42, wherein a number of PUSCH symbols is assumed to be fixed and does not correspond to an actual length of the PUSCH for which the UCI corresponds.

44. The wireless device of any of examples 32-41, wherein UCI coded symbol length is derived using the equation:

$$Q'_{CSI-1} = \min\left\{\left\lceil\frac{(O_{CSI-1} + L_{CSI-1}) \cdot \beta^{PUSCH}_{offset}}{R \cdot Q_m}\right\rceil,\right.$$

$$\left.\sum_{l=0}^{N^{PUSCH}_{symb,all}-1} M^{UCI}_{sc}(l) - Q'_{ACK}\right\},$$

wherein $Q_m$ and R are a modulation and a coding rate of the PUSCH.

45. The wireless device of example 44, wherein a length of the PUSCH is assumed to be fixed.

46. The wireless device of any of examples 32-45, further configured to receive a signal indicating an assumed starting symbol of the PUSCH for generating UCI coded symbols.

47. The wireless device of any of examples 32-41, wherein UCI coded symbol length is derived using the equation:

$$Q'_{CSI-1} = \left\lceil\frac{(O_{CSI} + L_{CSI}) \cdot \beta^{PUSCH}_{offset}}{R \cdot Q_m}\right\rceil$$

48. The wireless device of example 47, further configured to drop one or more UCI coded symbols.

49. A network node configured to:
   receive an UL transmission, the UL transmission comprising UL control information (UCI) multiplexed in a Physical Uplink Shared Channel (PUSCH), the UCI carrying one or more parameters for unlicensed spectrum; and
   determine a starting position for the UL transmission from among multiple data transmission starting positions.

50. The network node of example 49, wherein the starting position for the UL transmission is determined based on a number of UCI bits.

51. The network node of example 50, further configured to use the number of UCI bits as a reference for a starting symbol of the UL transmission.

52. The network node of any of examples 49-51, wherein the UL transmission starts with a demodulation reference signal symbol.

53. The network node of example 52, wherein UCI mapping starts from an immediate next symbol in the UL transmission after the demodulation reference signal symbol.

54. The network node of any of examples 49-53, wherein the UL transmission comprises one or more UCI coded symbols.

55. The network node of any of examples 49-54, wherein a number of UCI coded symbols is calculated independent of an actual length of the PUSCH.

56. The network node of any of examples 49-55, wherein a number of UCI coded symbols is calculated assuming a PUSCH length equivalent to a duration from a starting position of the UL transmission to an end of a slot.

57. The network node of any of examples 49-56, wherein UCI coded symbol length is derived using the equation:

$$Q'_{CSI-1} = \min\left\{\left\lceil\frac{(O_{CSI-1} + L_{CSI-1}) \cdot \beta^{PUSCH}_{offset} \cdot \sum_{l=0}^{N^{PUSCH}_{symb,all}-1} M^{UCI}_{sc}(l)}{\sum_{r=0}^{C_{UL-SCH}-1} K_r}\right\rceil,\right.$$

$$\left.\left\lceil\alpha \cdot \sum_{l=0}^{N^{PUSCH}_{symb,all}-1} M^{UCI}_{sc}(l)\right\rceil - Q'_{ACK}\right\}$$

58. The network node of example 57, wherein a number of PUSCH symbols is assumed to be fixed and does not correspond to an actual length of the PUSCH for which the UCI corresponds.

59. The network node of any of examples 49-56, wherein UCI coded symbol length is derived using the equation:

$$Q'_{CSI-1} = \min\left\{\left\lceil\frac{(O_{CSI-1} + L_{CSI-1}) \cdot \beta^{PUSCH}_{offset}}{R \cdot Q_m}\right\rceil,\right.$$

$$\left.\sum_{l=0}^{N^{PUSCH}_{symb,all}-1} M^{UCI}_{sc}(l) - Q'_{ACK}\right\},$$

wherein and R are a modulation and a coding rate of the PUSCH.

60. The network node of example 59, wherein a length of the PUSCH is assumed to be fixed.

61. The network node of any of examples 49-60, further configured to transmit a signal indicating an assumed starting symbol of the PUSCH for generating UCI coded symbols.

62. The network node of any of examples 49-56, wherein UCI coded symbol length is derived using the equation:

$$Q'_{CSI-1} = \left\lceil\frac{(O_{CSI} + L_{CSI}) \cdot \beta^{PUSCH}_{offset}}{R \cdot Q_m}\right\rceil$$

63. A wireless device, the wireless device comprising:
processing circuitry configured to perform any of the steps of any of the Group A examples; and
power supply circuitry configured to supply power to the wireless device.

64. A network node, the network node comprising:
processing circuitry configured to perform any of the steps of any of the Group B examples;
power supply circuitry configured to supply power to the network node.

65. A user equipment (UE), the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A examples;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

66. A communication system including a host computer comprising:
processing circuitry configured to provide user data; and
a communication interface configured to forward the user data to a cellular network for transmission to a user equipment (UE),
wherein the cellular network comprises a network node having a radio interface and processing circuitry, the network node's processing circuitry configured to perform any of the steps of any of the Group B examples.

67. The communication system of the pervious example further including the network node.

68. The communication system of the previous 2 examples, further including the UE, wherein the UE is configured to communicate with the network node.

69. The communication system of the previous 3 examples, wherein:
the processing circuitry of the host computer is configured to execute a host application, thereby providing the user data; and
the UE comprises processing circuitry configured to execute a client application associated with the host application.

70. A method implemented in a communication system including a host computer, a network node and a user equipment (UE), the method comprising:
at the host computer, providing user data; and
at the host computer, initiating a transmission carrying the user data to the UE via a cellular network comprising the network node, wherein the network node performs any of the steps of any of the Group B examples.

71. The method of the previous example, further comprising, at the network node, transmitting the user data.

72. The method of the previous 2 examples, wherein the user data is provided at the host computer by executing a host application, the method further comprising, at the UE, executing a client application associated with the host application.

73. A user equipment (UE) configured to communicate with a network node, the UE comprising a radio interface and processing circuitry configured to performs the of the previous 3 examples.

74. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A examples.

75. The communication system of the previous example, wherein the cellular network further includes a network node configured to communicate with the UE.

76. The communication system of the previous 2 examples, wherein:
the processing circuitry of the host computer is configured to execute a host application, thereby providing the user data; and
the UE's processing circuitry is configured to execute a client application associated with the host application.

77. A method implemented in a communication system including a host computer, a network node and a user equipment (UE), the method comprising:
at the host computer, providing user data; and
at the host computer, initiating a transmission carrying the user data to the UE via a cellular network comprising the network node, wherein the UE performs any of the steps of any of the Group A examples.

78. The method of the previous example, further comprising at the UE, receiving the user data from the network node.

79. A communication system including a host computer comprising:
communication interface configured to receive user data originating from a transmission from a user equipment (UE) to a network node,
wherein the UE comprises a radio interface and processing circuitry, the UE's processing circuitry configured to perform any of the steps of any of the Group A examples.

80. The communication system of the previous example, further including the UE.

81. The communication system of the previous 2 examples, further including the network node, wherein the network node comprises a radio interface configured to communicate with the UE and a communication interface configured to forward to the host computer the user data carried by a transmission from the UE to the network node.

82. The communication system of the previous 3 examples, wherein:
the processing circuitry of the host computer is configured to execute a host application; and
the UE's processing circuitry is configured to execute a client application associated with the host application, thereby providing the user data.

83. The communication system of the previous 4 examples, wherein:
the processing circuitry of the host computer is configured to execute a host application, thereby providing request data; and
the UE's processing circuitry is configured to execute a client application associated with the host application, thereby providing the user data in response to the request data.

84. A method implemented in a communication system including a host computer, a network node and a user equipment (UE), the method comprising:
at the host computer, receiving user data transmitted to the network node from the UE, wherein the UE performs any of the steps of any of the Group A examples.

85. The method of the previous example, further comprising, at the UE, providing the user data to the network node.

86. The method of the previous 2 examples, further comprising:
at the UE, executing a client application, thereby providing the user data to be transmitted; and
at the host computer, executing a host application associated with the client application.

87. The method of the previous 3 examples, further comprising:
at the UE, executing a client application; and
at the UE, receiving input data to the client application, the input data being provided at the host computer by executing a host application associated with the client application,
wherein the user data to be transmitted is provided by the client application in response to the input data.

88. A communication system including a host computer comprising a communication interface configured to receive user data originating from a transmission from a user equipment (UE) to a network node, wherein the network node comprises a radio interface and processing circuitry, the network node's processing circuitry configured to perform any of the steps of any of the Group B examples.

89. The communication system of the previous example further including the network node.

90. The communication system of the previous 2 examples, further including the UE, wherein the UE is configured to communicate with the network node.

91. The communication system of the previous 3 examples, wherein:
the processing circuitry of the host computer is configured to execute a host application;
the UE is configured to execute a client application associated with the host application, thereby providing the user data to be received by the host computer.

92. A method implemented in a communication system including a host computer, a network node and a user equipment (UE), the method comprising:
at the host computer, receiving, from the network node, user data originating from a transmission which the network node has received from the UE, wherein the UE performs any of the steps of any of the Group A examples.

93. The method of the previous example, further comprising at the network node, receiving the user data from the UE.

94. The method of the previous 2 examples, further comprising at the network node, initiating a transmission of the received user data to the host computer.

95. A computer program, the program comprising instructions which when executed on a computer perform any one of the methods of examples 1-17.

96. A computer program product comprising a computer program, the program comprising instructions which when executed on a computer perform any one of the methods of examples 1-17.

97. A computer storage medium comprising a computer program, the program comprising instructions which when executed on a computer perform any one of the methods of examples 1-17.

98. A computer storage carrier comprising a computer program, the program comprising instructions which when executed on a computer perform any one of the methods of examples 1-17.

99. A computer program, the program comprising instructions which when executed on a computer perform any one of the methods of examples 18-31.

100. A computer program product comprising a computer program, the program comprising instructions which when executed on a computer perform any one of the methods of examples 18-31.

101. A computer storage medium comprising a computer program, the program comprising instructions which when executed on a computer perform any one of the methods of examples 18-31.

102. A computer storage carrier comprising a computer program, the program comprising instructions which when executed on a computer perform any one of the methods of examples 18.

The invention claimed is:

1. A method performed by a wireless device, the method comprising:
   receiving a configuration for one or more data transmission starting positions for a configured uplink (UL) in unlicensed spectrum, the one or more data transmission starting positions comprising at least a first starting position; and
   performing an UL transmission at one of the one or more data transmission starting positions based on when the wireless device is able to access a channel, the UL transmission comprising uplink control information (UCI) multiplexed in a Physical Uplink Shared Channel (PUSCH), the UCI carrying one or more parameters for unlicensed spectrum, wherein the UL transmission starts with a demodulation reference signal symbol,
   wherein the one or more parameters comprises a UCI coded symbol length that is derived using an equation:

$$Q'_{CSI} = \left\lceil \frac{(O_{CSI} + L_{CSI}) \cdot \beta_{offset}^{PUSCH}}{R \cdot Q_m} \right\rceil$$

wherein:
   $O_{CSI}$ is a number of bits for a configured grant UCI;
   if $O_{CSI\text{-}1} \geq 360$, $L_{CSI\text{-}1}=11$; otherwise $L_{CSI\text{-}1}$ is the number of CRC bits for CSI part 1;
   $\beta_{offset}^{PUSCH} = \beta_{offset}^{CSI\text{-}part1}$;
   $Q_m$ is a modulation rate of the PUSCH;
   R is ta coding rate of the PUSCH, and
   wherein the method further comprises dropping one or more UCI coded symbols.

2. The method of claim 1, comprising:
   preparing the UL transmission assuming that resources are available from the first starting position.

3. The method of claim 2, wherein a UCI mapping starts from an immediate next symbol in the UL transmission after the demodulation reference signal symbol.

4. The method of claim 1, wherein a number of UCI coded symbols is calculated independent of an actual length of the PUSCH or assuming a PUSCH length equivalent to a duration from a starting position of the UL transmission to an end of a slot.

5. The method of claim 1, wherein the one or more parameters comprise a UCI coded symbol length that is derived using the equation:

$$Q'_{CSI-1} = \min\left\{ \left\lceil \frac{(O_{CSI-1} + L_{CSI-1}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \right.$$

$$\left. \left\lceil \alpha \cdot \sum_{l=0}^{N_{symb,all}^{PUSCH}-1} M_{sc}^{UCI}(l) \right\rceil - Q'_{ACK} \right\}$$

wherein:
   $O_{CSI\text{-}1}$ represents a number of bits for a configured grant UCI;
   $O_{CSI}$ is a number of bits for a configured grant UCI;
   if $O_{CSI\text{-}1} \geq 360$, $L_{CSI\text{-}1}=11$; otherwise $L_{CSI\text{-}1}$ is the number of CRC bits for CSI part 1;
   $\beta_{offset}^{PUSCH} = \beta_{offset}^{CSI\text{-}part1}$;
   $C_{UL\text{-}SCH}$ is a number of code blocks for an uplink shared channel (UL-SCH) of the UL transmission on the PUSCH;
   if a downlink control information (DCI) format scheduling the UL transmission on the PUSCH includes a CBGTI field indicating that the wireless device shall not transmit the r-th code block, $K_r=0$; otherwise, $K_r$ is the r-th code block size for the UL-SCH of the transmission on the PUSCH;
   $Q_{ACK}$ is a number of coded modulation symbols per layer for HARQ-ACK transmitted on the PUSCH if a number of HARQ-ACK information bits is more than 2, and $$Q'_{ACK} = \sum_{l=0}^{N_{symb,all}^{PUSCH}-1} \overline{M}_{sc,rvd}^{ACK}(l)$$

if the number of HARQ-ACK information bits is no more than 2 bits, where $\overline{M}_{sc,rvd}^{ACK}(l)$ is the number of reserved resource elements for a potential HARQ-ACK transmission in an OFDM symbol l, for l=0, 1, 2, . . . , $N_{symball}^{PUSCH}-1$, in the PUSCH transmission;
   $M_{SC}^{UCI}(l)$ is a number of resource elements that can be used for transmission of UCI in an OFDM symbol l, for l=0, 1, 2, . . . , $N_{symball}^{PUSCH}-1$, in the UL transmission on the PUSCH and $N_{symb,all}^{PUSCH}$ is a total number of OFDM symbols of the PUSCH, including all OFDM symbols used for DMRS;
   for any OFDM symbol that carries DMRS of the PUSCH, $M_{SC}^{UCI}(l)=0$;
   for any OFDM symbol that does not carry DMRS of the PUSCH,
   $M_{sc}^{UCI}(l) = M_{sc}^{PUSCH} - M_{sc}^{PT\text{-}RS}(l)$;
   $\alpha$ is configured by higher layer parameter scaling;
   $Q_m$ is a modulation rate of the PUSCH; and
   R is a coding rate of the PUSCH,
   wherein a number of PUSCH symbols is assumed to be fixed and does not correspond to an actual length of the PUSCH for the UCI.

6. The method of claim 1, wherein the one or more parameters comprise a UCI coded symbol length that is derived using an equation:

$$Q'_{CSI-1} = \min\left\{ \left\lceil \frac{(O_{CSI-1} + L_{CSI-1}) \cdot \beta_{offset}^{PUSCH}}{R \cdot Q_m} \right\rceil, \right.$$

-continued $$\left. \sum_{l=0}^{N_{symb,all}^{PUSCH}-1} M_{sc}^{UCI}(l) - Q'_{ACK} \right\},$$

wherein:
$O_{CSI-1}$ represents a number of bits for a configured grant UCI;
if $O_{CSI-1} \geq 360$, $L_{CSI-1}=11$; otherwise $L_{CSI-1}$ is the number of CRC bits for CSI part 1;
$\beta_{offset}^{PUSCH}=\beta_{offset}^{CSI-part1}$;
$Q_{ACK}$ is a number of coded modulation symbols per layer for HARQ-ACK transmitted on the PUSCH if a number of HARQ-ACK information bits is more than 2, and $$Q'_{ACK} = \sum_{l=0}^{N_{symb,all}^{PUSCH}-1} \overline{M}_{sc,rvd}^{ACK}(l)$$

if the number of HARQ-ACK information bits is no more than 2 bits, where $\overline{M}_{sc,rvd}^{ACK}(l)$ is the number of reserved resource elements for a potential HARQ-ACK transmission in an OFDM symbol l, for l=0, 1, 2, ..., $N_{symball}^{PUSCH}-1$, in the PUSCH transmission;

$M_{sc}^{UCI}(l)$ is a number of resource elements that can be used for transmission of UCI in an OFDM symbol l, for l=0, 1, 2, ..., $N_{symball}^{PUSCH}-1$, in the UL transmission on the PUSCH and $N_{symb,all}^{PUSCH}$ is a total number of OFDM symbols of the PUSCH, including all OFDM symbols used for DMRS;

for any OFDM symbol that carries DMRS of the PUSCH, $M_{sc}^{UCI}(l)=0$;

for any OFDM symbol that does not carry DMRS of the PUSCH,
$M_{sc}^{UCI}(l)=M_{sc}^{PUSCH}-M_{sc}^{PT-RS}(l)$;
$\alpha$ is configured by higher layer parameter scaling;
$Q_m$ is a modulation rate of the PUSCH; and
R is a coding rate of the PUSCH,
wherein a length of the PUSCH is assumed to be fixed.

7. The method of claim 1, further comprising:
receiving a signal indicating an assumed starting symbol of the PUSCH for generating UCI coded symbols.

8. The method of claim 1, wherein the one or more parameters comprise a UCI coded symbol length that is derived using the equation:

$$Q'_{CG-UCI} = \min\left\{ \left\lceil \frac{(O_{CG-UCI} + L_{CG-UCI}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \right.$$

$$\left. \left\lceil \alpha \cdot \sum_{l=0}^{N_{symb,all}^{PUSCH}-1} M_{sc}^{UCI}(l) \right\rceil - Q'_{ACK} \right\}$$

wherein:
$O_{CG-UCI}$ is a number of bits for a configured grant UCI;
$O_{CG-UCI}$ is a number of bits for a configured grant UCI;
if $O_{CG-UCI} \geq 360$, $L_{CG-UCI}=11$; otherwise $L_{CG-UCI}$ is a number of CRC bits for configured grant UCI;

$\beta_{offset}^{PUSCH}=\beta_{offset}^{CG-UCI}$; $\beta_{offset}^{CG-UCI}$ is scaling factor to define the number of resources for multiplexing configured grant UCI information in PUSCH;

$C_{UL-SCH}$ is a number of code blocks for an uplink shared channel (UL-SCH) of the UL transmission on the PUSCH;

if a downlink control information (DCI) format scheduling the UL transmission on the PUSCH includes a CBGTI field indicating that the wireless device shall not transmit the r-th code block, K=0; otherwise, $K_r$ is the r-th code block size for the UL-SCH of the transmission on the PUSCH;

$Q_{ACK}$ is a number of coded modulation symbols per layer for HARQ-ACK transmitted on the PUSCH if a number of HARQ-ACK information bits is more than 2, and $$Q'_{ACK} = \sum_{l=0}^{N_{symb,all}^{PUSCH}-1} \overline{M}_{sc,rvd}^{ACK}(l)$$

if the number of HARQ-ACK information bits is no more than 2 bits, where $\overline{M}_{sc,rvd}^{ACK}(l)$ is the number of reserved resource elements for a potential HARQ-ACK transmission in an OFDM symbol l, for l=0, 1, 2, ..., $N_{symball}^{PUSCH}-1$, in the PUSCH transmission;

$M_{sc}^{UCI}(l)$ is a number of resource elements that can be used for transmission of UCI in an OFDM symbol l, for l=0, 1, 2, ..., $N_{symball}^{PUSCH}-1$, in the UL transmission on the PUSCH and $N_{symb,all}^{PUSCH}$ is a total number of OFDM symbols of the PUSCH, including all OFDM symbols used for DMRS;

for any OFDM symbol that carries DMRS of the PUSCH, $M_{sc}^{UCI}(l)=0$;

for any OFDM symbol that does not carry DMRS of the PUSCH,
$M_{sc}^{UCI}(l)=M_{sc}^{PUSCH}-M_{sc}^{PT-RS}(l)$;
$\alpha$ is configured by higher layer parameter scaling;
$Q_m$ is a modulation rate of the PUSCH; and
R is a coding rate of the PUSCH,
wherein a number of PUSCH symbols is assumed to be fixed and does not correspond to an actual length of the PUSCH for the UCI.

9. The method of claim 8, further comprising:
receiving a signal indicating an assumed starting symbol of the PUSCH for generating UCI coded symbols.

10. The method of claim 1, wherein the one or more parameters comprise a UCI coded symbol length that is derived using an equation:

$$Q'_{CG-UCI} = \min\left\{ \left\lceil \frac{(O_{CG-UGI} + L_{CG-UGI}) \cdot \beta_{offset}^{PUSCH}}{R \cdot Q_m} \right\rceil, \right.$$

$$\left. \sum_{l=0}^{N_{symb,all}^{PUSCH}-1} M_{sc}^{UCI}(l) - Q'_{ACK} \right\},$$

wherein:
$O_{CG-UCI}$ represents a number of bits for a configured grant UCI;
if $O_{CG-UCI} \geq 360$, $L_{CG-UCI}=11$; otherwise $L_{CG-UCI}$ is a number of CRC bits for configured grant UCI;
$\beta_{offset}^{PUSCH}=\beta_{offset}^{CG-UCI}$; $\beta_{offset}^{CG-UCI}$ is scaling factor to define the number of resources for multiplexing configured grant UCI information in PUSCH;

$Q_{ACK}$ is a number of coded modulation symbols per layer for HARQ-ACK transmitted on the PUSCH if a number of HARQ-ACK information bits is more than 2, and $$Q'_{ACK} = \sum_{l=0}^{N_{symb,all}^{PUSCH}-1} \overline{M}_{sc,rvd}^{ACK}(l)$$

if the number of HARQ-ACK information bits is no more than 2 bits, where $\overline{M}_{sc,rvd}^{ACK}(l)$ is the number of reserved resource elements for a potential HARQ-ACK transmission in an OFDM symbol l, for l=0, 1, 2, ..., $N_{symb,all}^{PUSCH}-1$, in the PUSCH transmission;

$M_{SC}^{UCI}(l)$ is a number of resource elements that can be used for transmission of UCI in an OFDM symbol l, for l=0, 1, 2, ..., $N_{symb,all}^{PUSCH}-1$, in the UL transmission on the PUSCH and $N_{symb,all}^{PUSCH}$ is a total number of OFDM symbols of the PUSCH, including all OFDM symbols used for DMRS;

for any OFDM symbol that carries DMRS of the PUSCH, $M_{SC}^{UCI}(l)=0$;

for any OFDM symbol that does not carry DMRS of the PUSCH, $M_{sc}^{UCI}(l) = M_{sc}^{PUSCH} - M_{sc}^{PT-RS}(l)$;

α is configured by higher layer parameter scaling;

$Q_m$ is a modulation rate of the PUSCH; and

R is a coding rate of the PUSCH, wherein a length of the PUSCH is assumed to be fixed.

11. The method of claim 1, wherein the one or more parameters comprises a UCI coded symbol length that is derived using an equation:

$$Q'_{CG-UCI} = \left\lceil \frac{(O_{CG-UGI} + L_{CG-UGI}) \cdot \beta_{offset}^{PUSCH}}{R \cdot Q_m} \right\rceil$$

wherein:

$O_{CG-UCI}$ is a number of bits for a configured grant UCI;

if $O_{CG-UCI} \geq 360$, $L_{CG-UCI}=11$; otherwise $L_{CG-UCI}$ is the number of CRC bits for configured grant UCI;

$\beta_{offset}^{PUSCH} = \beta_{offset}^{CG-UCI}$; is scaling factor to define the number of resources for multiplexing configured grant UCI information in PUSCH;

$Q_m$ is a modulation rate of the PUSCH; and

R is ta coding rate of the PUSCH.

12. The method of claim 11, further comprising dropping one or more UCI coded symbols.

13. A method performed by a network node, the method comprising:

sending a configuration for one or more data transmission starting positions for a configured uplink (UL) in unlicensed spectrum, the one or more data transmission starting positions comprising at least a first starting position;

receiving an UL transmission, the UL transmission comprising uplink control information (UCI), multiplexed in a Physical Uplink Shared Channel (PUSCH), the UCI carrying one or more parameters for the unlicensed spectrum; and determining the first starting position for the UL transmission from among the one or more data transmission starting positions, wherein the UL transmission starts with a demodulation reference signal symbol, wherein the one or more parameters comprises a UCI coded symbol length that is derived using an equation:

$$Q'_{CSI-1} = \left\lceil \frac{(O_{CSI} + L_{CSI}) \cdot \beta_{offset}^{PUSCH}}{R \cdot Q_m} \right\rceil$$

wherein:

$O_{CSI}$ is a number of bits for a configured grant UCI;

if $O_{CSI-1} \geq 360$, $L_{CSI-1}=11$; otherwise $L_{CSI-1}$ is the number of CRC bits for CSI part 1;

$\beta_{offset}^{PUSCH} = \beta_{offset}^{CSI-part\ 1}$;

$Q_m$ is a modulation rate of the PUSCH;

R is ta coding rate of the PUSCH, and wherein the method further comprises dropping one or more UCI coded symbols.

14. The method of claim 13, wherein the starting position for the UL transmission is determined based on a number of UCI bits, wherein the number of UCI bits is used as a reference for a starting symbol of the UL transmission.

15. The method of claim 13, wherein a UCI mapping starts from an immediate next symbol in the UL transmission after the demodulation reference signal symbol.

16. The method of claim 13, further comprising:

transmitting a signal indicating an assumed starting symbol of the PUSCH for generating UCI coded symbols.

17. A wireless device comprising a processor, wherein the processor is configured to:

receive a configuration for one or more data transmission starting positions for a configured uplink (UL) in unlicensed spectrum, the one or more data transmission starting positions comprising at least a first starting position; and perform an UL transmission at one of the one or more data transmission starting positions based on when the wireless device is able to access a channel, the UL transmission comprising UL control information (UCI), multiplexed in a Physical Uplink Shared Channel (PUSCH), the UCI carrying one or more parameters for unlicensed spectrum, wherein the UL transmission starts with a demodulation reference signal symbol, wherein the one or more parameters comprises a UCI coded symbol length that is derived using an equation:

$$Q'_{CSI} = \left\lceil \frac{(O_{CSI} + L_{CSI}) \cdot \beta_{offset}^{PUSCH}}{R \cdot Q_m} \right\rceil$$

wherein:

$O_{CSI}$ is a number of bits for a configured grant UCI;

if $O_{CSI-1} \geq 360$, $L_{CSI-1}=11$; otherwise $L_{CSI-1}$ is the number of CRC bits for CSI part 1;

$\beta_{offset}^{PUSCH} = \beta_{offset}^{CSI-part\ 1}$;

$Q_m$ is a modulation rate of the PUSCH;

R is ta coding rate of the PUSCH, and wherein the processor is further configured to drop one or more UCI coded symbols.

18. A network node comprising a processor, wherein the processor is configured to:

send a configuration for one or more data transmission starting positions for a configured uplink (UL) in unlicensed spectrum, the one or more data transmission starting positions comprising at least a first starting position;

receive an UL transmission, the UL transmission comprising uplink control information (UCI), multiplexed in a Physical Uplink Shared Channel (PUSCH), the UCI carrying one or more parameters for unlicensed spectrum; and determine the first starting position for the UL transmission from among the one or more data transmission starting positions, wherein the UL transmission starts with a demodulation reference signal symbol, wherein the one or more parameters comprises a UCI coded symbol length that is derived using an equation:

$$Q'_{CSI} = \left\lceil \frac{(O_{CSI} + L_{CSI}) \cdot \beta_{offset}^{PUSCH}}{R \cdot Q_m} \right\rceil$$

wherein:
$O_{CSI}$ is a number of bits for a configured grant UCI;
if $O_{CSI-1} \geq 360$, $L_{CSI-1}=11$; otherwise $L_{CSI-1}$ is the number of CRC bits for CSI part 1;
$\beta_{offset}^{PUSCH} = \beta_{offset}^{CSI-part\ 1}$;
$Q_m$ is a modulation rate of the PUSCH;
R is ta coding rate of the PUSCH, and
wherein the processor is further configured to drop one or more UCI coded symbols.

* * * * *